(12) United States Patent
Kothari et al.

(10) Patent No.: US 12,592,968 B2
(45) Date of Patent: Mar. 31, 2026

(54) CLOUD-BASED DECEPTION TECHNOLOGY WITH GRANULAR SCORING FOR BREACH DETECTION

(71) Applicant: Zscaler, Inc., San Jose, CA (US)

(72) Inventors: Bhavesh Kothari, Pune (IN); Sahir Hidayatullah, Mumbai (IN); Deepen Desai, San Ramon, CA (US); Akshay Shah, Bangalore (IN); Reshad Patuck, Mumbai (IN)

(73) Assignee: Zscaler, Inc., San Jose, CA (US)

( * ) Notice: Subject to any disclaimer, the term of this patent is extended or adjusted under 35 U.S.C. 154(b) by 237 days.

(21) Appl. No.: 17/724,625

(22) Filed: Apr. 20, 2022

(65) Prior Publication Data

US 2023/0164183 A1 May 25, 2023

Related U.S. Application Data

(63) Continuation of application No. 17/571,460, filed on Jan. 8, 2022, now Pat. No. 12,107,889.

(30) Foreign Application Priority Data

Nov. 23, 2021 (IN) .............................. 202111053875

(51) Int. Cl.
*H04L 9/40* (2022.01)
(52) U.S. Cl.
CPC ...... *H04L 63/1491* (2013.01); *H04L 63/1416* (2013.01); *H04L 63/1425* (2013.01)

(58) Field of Classification Search
CPC ......................... H04L 63/1491; H04L 63/1416
USPC ............................................................. 726/23
See application file for complete search history.

(56) References Cited

U.S. PATENT DOCUMENTS

| | | | | |
|---|---|---|---|---|
| 10,142,362 | B2 | 11/2018 | Weith et al. | |
| 10,419,477 | B2 | 9/2019 | Desai et al. | |
| 10,498,605 | B2 | 12/2019 | Weith et al. | |
| 10,574,697 | B1 * | 2/2020 | McClintock | ........ H04L 63/1491 |
| 10,855,722 | B1 | 12/2020 | Vadlamani | |
| 10,873,601 | B1 * | 12/2020 | Stickle | ................ H04L 63/1416 |
| 11,032,319 | B1 * | 6/2021 | Roundy | .................. G06F 21/62 |

(Continued)

FOREIGN PATENT DOCUMENTS

| | | | | |
|---|---|---|---|---|
| CN | 111 641 620 A | | 9/2020 | |
| GB | 2606591 A | * | 11/2022 | ......... H04L 63/1491 |

OTHER PUBLICATIONS

Mar. 20, 2023, Extended European Search Report issued for European Patent Application No. EP 22 19 3125.

*Primary Examiner* — Hee Soo Kim
(74) *Attorney, Agent, or Firm* — Baratta Law PLLC; Lawrence A. Baratta, Jr.; Ryan Odessa

(57) ABSTRACT

Cloud-based deception systems and methods include monitoring activity associated with a plurality of decoys hosted in a decoy cloud environment for a customer, wherein the decoy cloud environment is separate from a real environment of the customer, and wherein the activity is between one or more fake assets on user devices of users associated with the customer; scoring the activity based on various steps taken between a fake asset and a decoy; and detecting a breach of the customer based on the scoring of the activity. The scoring includes increasing a score based on any activity by an attacker between the fake asset and the decoy.

20 Claims, 10 Drawing Sheets

(56)  References Cited

U.S. PATENT DOCUMENTS

| | | | | |
|---|---|---|---|---|
| 11,770,408 | B2 * | 9/2023 | Krauss | H04L 63/1416 |
| | | | | 726/23 |
| 2009/0178142 | A1 * | 7/2009 | Lieblich | G06F 21/316 |
| | | | | 726/25 |
| 2016/0065601 | A1 * | 3/2016 | Gong | H04L 63/145 |
| | | | | 726/23 |
| 2017/0359376 | A1 * | 12/2017 | Evron | H04L 63/1425 |
| 2019/0108333 | A1 * | 4/2019 | Licata | H04L 63/02 |
| 2019/0281073 | A1 | 9/2019 | Weith et al. | |
| 2019/0306719 | A1 * | 10/2019 | Chari | H04L 63/1425 |
| 2019/0319972 | A1 | 10/2019 | Desai | |
| 2020/0320192 | A1 | 10/2020 | Ma et al. | |
| 2021/0058428 | A1 | 2/2021 | Arlitt et al. | |
| 2021/0067553 | A1 * | 3/2021 | Ries | H04L 63/08 |
| 2021/0105289 | A1 | 4/2021 | Desai et al. | |
| 2021/0192043 | A1 | 6/2021 | Bhary et al. | |
| 2021/0194925 | A1 * | 6/2021 | Xiao | H04L 63/0227 |
| 2021/0344693 | A1 | 11/2021 | Azad et al. | |
| 2022/0109692 | A1 * | 4/2022 | Hebert | G06F 9/547 |
| 2022/0210163 | A1 * | 6/2022 | Norman | H04L 63/20 |

* cited by examiner

SIGNATURES
ACCURATE, BUT THREAT
SPECIFIC AND EVADABLE

BEHAVIORS
BROAD, BUT PRONE
TO FALSE POSITIVES

DECEPTION
HIGHLY ACCURATE
AND BROAD COVERAGE

CLOUD-BASED DECEPTION TECHNOLOGY WITH GRANULAR SCORING FOR BREACH DETECTION

CROSS-REFERENCE TO RELATED APPLICATION(S)

The present disclosure is a continuation of U.S. patent application Ser. No. 17/571,460, filed Jan. 8, 2022, which claims priority to Indian Patent Application No. 202111053875, filed Nov. 23, 2021, the contents of each is incorporated by reference in their entirety.

FIELD OF THE DISCLOSURE

The present disclosure relates generally to networking and computing. More particularly, the present disclosure relates to systems and methods for cloud-based deception technology to identify threat intelligence, telemetry, and emerging adversary tactics and techniques.

BACKGROUND OF THE DISCLOSURE

Cyberthreats are evolving and becoming advanced as well as critically impacting business. For example, the Colonial Pipeline ransomware attack shut down operations for days and there was a need for immediate, high-confidence detections to drive effective response. Deception technology can provide rich threat intelligence, telemetry, and emerging adversary tactics and techniques. Conventional deception technology involves placing decoys (also known as honeypots, traps, etc.) on user devices and enterprise networks. These are typically placed at critical infrastructure where there cannot be a breach. The deception technology is able to monitor malicious actors to catch them and provide insight into how they operate. Security teams cannot separate the signal from the noise to take a proactive stance against the stealthiest attackers. Security analysts lose time chasing ghosts, the role of active defense (deception technology) has never been more critical. By taking the fight to the attacker, leading them down false paths with decoys deployed across networks, endpoints, and applications, and gathering the highest-fidelity security telemetry, it is possible to dramatically speed up threat hunting and containment.

Existing deception technology solutions typically require agents that are executed on user devices as well as on-site appliances located in the enterprise network. Cloud-based security solutions have emerged, such as Zscaler Internet Access (ZIA) and Zscaler Private Access (ZPA), available from Zscaler, Inc., the applicant and assignee of the present application. The problem with hardware-based solutions (with appliances) is they do not scale and require infrastructure in the customer network.

BRIEF SUMMARY OF THE DISCLOSURE

The present disclosure relates to systems and methods for cloud-based deception technology to identify threat intelligence, telemetry, and emerging adversary tactics and techniques. Variously, the present disclosure includes integration of deception technology with a cloud-based security system, namely without on-premises appliances. Further, the present disclosure includes targeted threat detection where activity is logged only related to breadcrumbs (fake data intentionally put on the user device). Also, the present disclosure includes dynamic risk scoring where all hits on a breadcrumb/honeypot are malicious by definition—this risk scoring covers a unique way to convey the actual threat. The present disclosure includes an approach to rapidly deploy breadcrumbs/honeypots to make each one look unique and look like a customer environment, so the attackers do not know. Even further, the present disclosure enables the breadcrumbs/honeypots based on user type, e.g., sales, marketing, legal, R&D, etc.

BRIEF DESCRIPTION OF THE DRAWINGS

The present disclosure is illustrated and described herein with reference to the various drawings, in which like reference numbers are used to denote like system components/method steps, as appropriate, and in which:

FIG. 3 is a block diagram of a server that may be used in the cloud-based system of FIGS. 1 and 2 or the like.

FIG. 4 is a block diagram of a user device that may be used with the cloud-based system of FIGS. 1 and 2 or the like.

DETAILED DESCRIPTION OF THE DISCLOSURE

Again, the present disclosure relates to systems and methods for cloud-based deception technology to identify threat intelligence, telemetry, and emerging adversary tactics and techniques. Variously, the present disclosure includes integration of deception technology with a cloud-based security system, namely without on-premises appliances. Further, the present disclosure includes targeted threat detection where activity is logged only related to breadcrumbs (fake data intentionally put on the user device). Also, the present disclosure includes dynamic risk scoring where all hits on a breadcrumb/honeypot are malicious by definition—this risk scoring covers a unique way to convey the actual threat. The present disclosure includes an approach to rapidly deploy breadcrumbs/honeypots to make each one look unique and look like a customer environment, so the attackers do not know. Even further, the present disclosure enables the breadcrumbs/honeypots based on user type, e.g., sales, marketing, legal, R&D, etc.

1.0 example cloud-based system architecture

Figure 1:
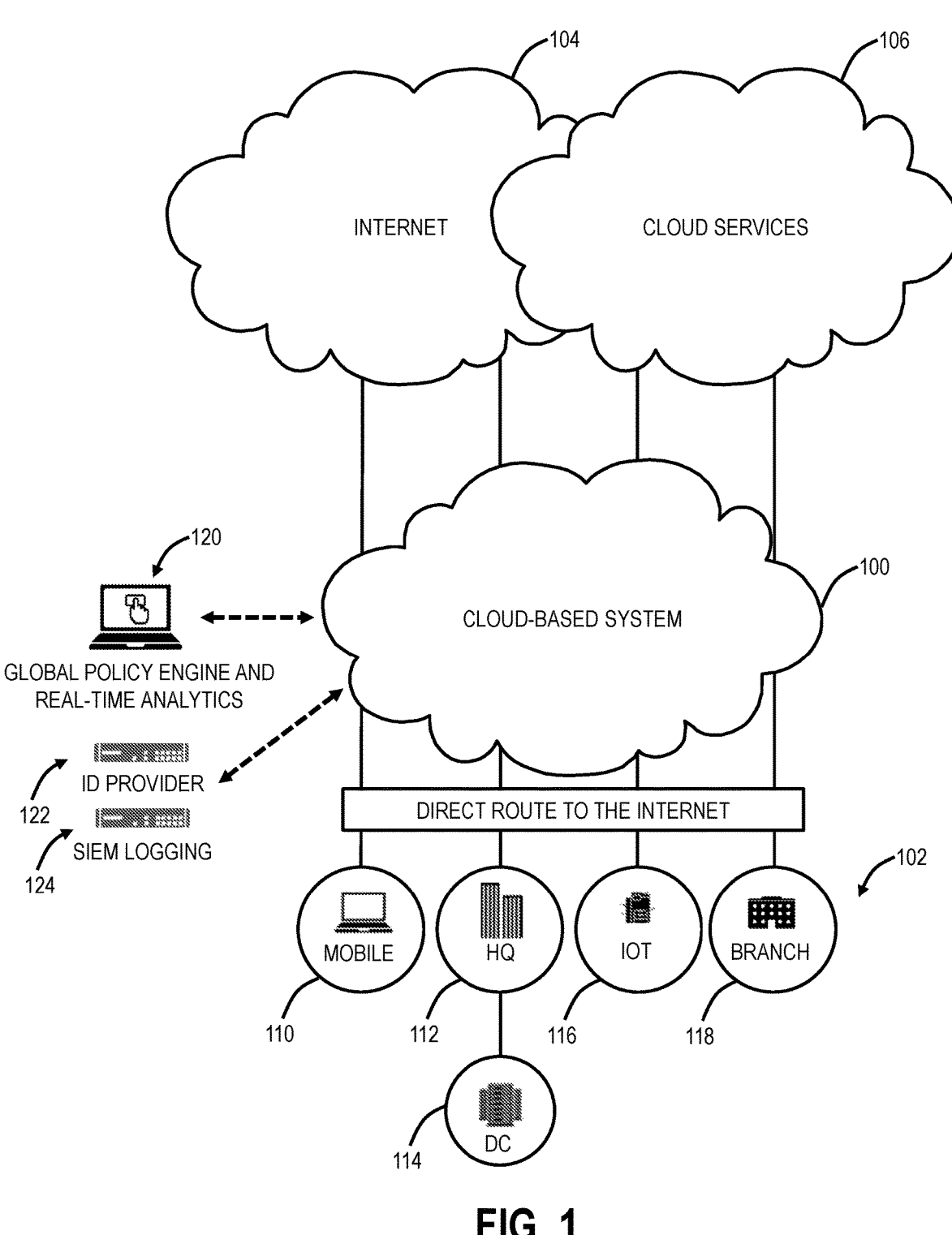
FIG. 1 is a network diagram of a cloud-based system offering security as a service.

FIG. 1 is a network diagram of a cloud-based system 100 offering security as a service. Specifically, the cloud-based system 100 can offer a Secure Internet and Web Gateway as a service to various users 102, as well as other cloud services. In this manner, the cloud-based system 100 is located between the users 102 and the Internet as well as any cloud services 106 (or applications) accessed by the users 102. As such, the cloud-based system 100 provides inline monitoring inspecting traffic between the users 102, the Internet 104, and the cloud services 106, including Secure Sockets Layer (SSL) traffic. The cloud-based system 100 can offer access control, threat prevention, data protection, etc. The access control can include a cloud-based firewall, cloud-based intrusion detection, Uniform Resource Locator (URL) filtering, bandwidth control, Domain Name System (DNS) filtering, etc. The threat prevention can include cloud-based intrusion prevention, protection against advanced threats (malware, spam, Cross-Site Scripting (XSS), phishing, etc.), cloud-based sandbox, antivirus, DNS security, etc. The data protection can include Data Loss Prevention (DLP), cloud application security such as via a Cloud Access Security Broker (CASB), file type control, etc.

The cloud-based firewall can provide Deep Packet Inspection (DPI) and access controls across various ports and protocols as well as being application and user aware. The URL filtering can block, allow, or limit website access based on policy for a user, group of users, or entire organization, including specific destinations or categories of URLs (e.g., gambling, social media, etc.). The bandwidth control can enforce bandwidth policies and prioritize critical applications such as relative to recreational traffic. DNS filtering can control and block DNS requests against known and malicious destinations.

The cloud-based intrusion prevention and advanced threat protection can deliver full threat protection against malicious content such as browser exploits, scripts, identified botnets and malware callbacks, etc. The cloud-based sandbox can block zero-day exploits (just identified) by analyzing unknown files for malicious behavior. Advantageously, the cloud-based system 100 is multi-tenant and can service a large volume of the users 102. As such, newly discovered threats can be promulgated throughout the cloud-based system 100 for all tenants practically instantaneously. The antivirus protection can include antivirus, antispyware, anti-malware, etc. protection for the users 102, using signatures sourced and constantly updated. The DNS security can identify and route command-and-control connections to threat detection engines for full content inspection.

The DLP can use standard and/or custom dictionaries to continuously monitor the users 102, including compressed and/or SSL-encrypted traffic. Again, being in a cloud implementation, the cloud-based system 100 can scale this monitoring with near-zero latency on the users 102. The cloud application security can include CASB functionality to discover and control user access to known and unknown cloud services 106. The file type controls enable true file type control by the user, location, destination, etc. to determine which files are allowed or not.

The cloud-based system 100 can provide other security functions, including, for example, micro-segmentation, workload segmentation, API security, Cloud Security Posture Management (CSPM), user identity management, and the like. That is, the cloud-based system 100 provides a network architecture that enables delivery of any cloud-based security service, including emerging frameworks.

Figure 5:
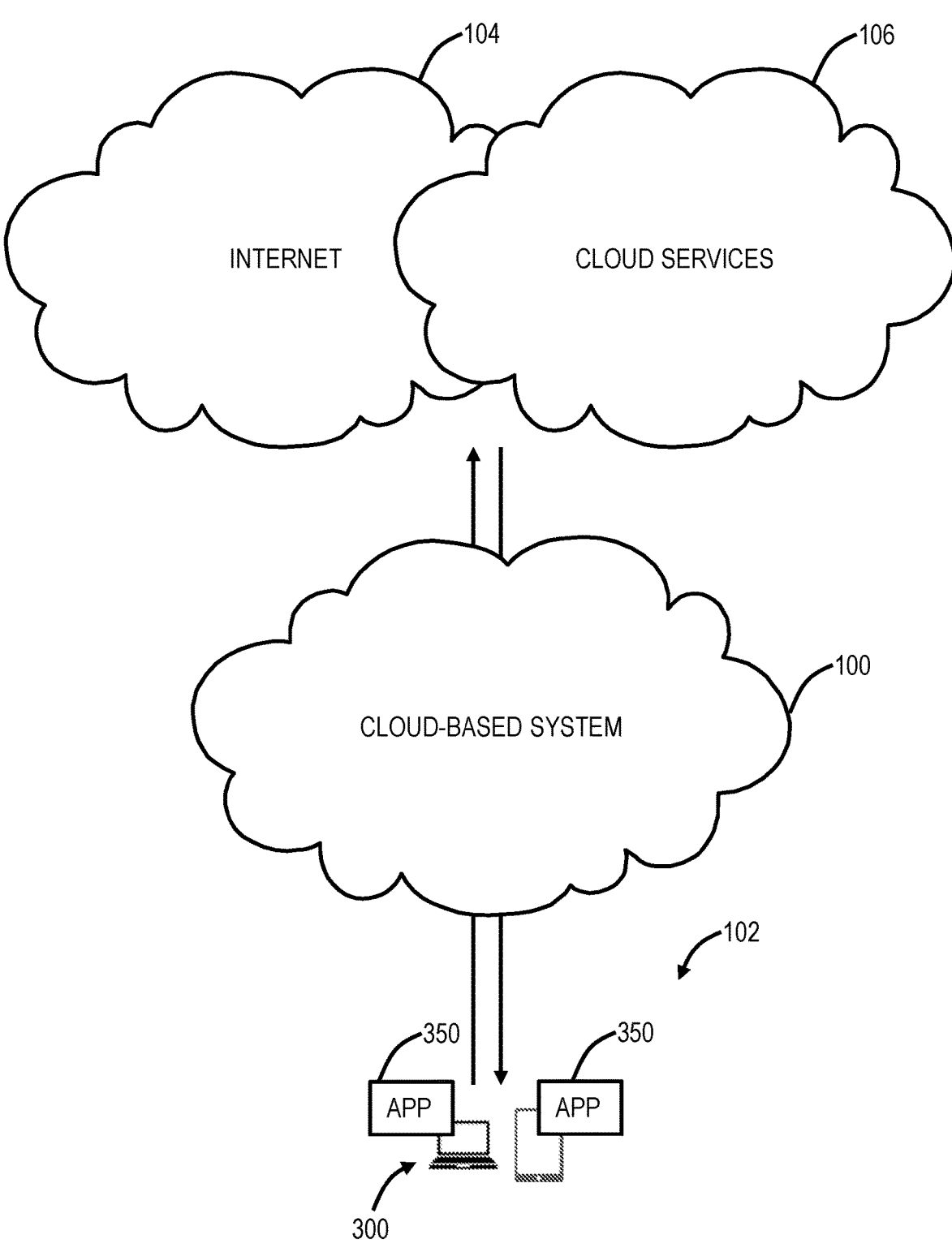
FIG. 5 is a network diagram of the cloud-based system illustrating an application on user devices with users configured to operate through the cloud-based system.

For illustration purposes, the users 102 of the cloud-based system 100 can include a mobile device 110, a headquarters (HQ) 112 which can include or connect to a data center (DC) 114, Internet of Things (IoT) devices 116, a branch office/remote location 118, etc., and each includes one or more user devices (an example user device 300 is illustrated in FIG. 5). The devices 110, 116, and the locations 112, 114, 118 are shown for illustrative purposes, and those skilled in the art will recognize there are various access scenarios and other users 102 for the cloud-based system 100, all of which are contemplated herein. The users 102 can be associated with a tenant, which may include an enterprise, a corporation, an organization, etc. That is, a tenant is a group of users who share a common access with specific privileges to the cloud-based system 100, a cloud service, etc. In an embodiment, the headquarters 112 can include an enterprise's network with resources in the data center 114. The mobile device 110 can be a so-called road warrior, i.e., users that are off-site, on-the-road, etc. Those skilled in the art will recognize a user 102 has to use a corresponding user device 300 for accessing the cloud-based system 100 and the like, and the description herein may use the user 102 and/or the user device 300 interchangeably.

Further, the cloud-based system 100 can be multi-tenant, with each tenant having its own users 102 and configuration, policy, rules, etc. One advantage of the multi-tenancy and a large volume of users is the zero-day/zero-hour protection in that a new vulnerability can be detected and then instantly remediated across the entire cloud-based system 100. The same applies to policy, rule, configuration, etc. changes—they are instantly remediated across the entire cloud-based system 100. As well, new features in the cloud-based system 100 can also be rolled up simultaneously across the user base, as opposed to selective and time-consuming upgrades on every device at the locations 112, 114, 118, and the devices 110, 116.

Logically, the cloud-based system 100 can be viewed as an overlay network between users (at the locations 112, 114, 118, and the devices 110, 116) and the Internet 104 and the cloud services 106. Previously, the IT deployment model included enterprise resources and applications stored within the data center 114 (i.e., physical devices) behind a firewall (perimeter), accessible by employees, partners, contractors, etc. on-site or remote via Virtual Private Networks (VPNs), etc. The cloud-based system 100 is replacing the conventional deployment model. The cloud-based system 100 can be used to implement these services in the cloud without requiring the physical devices and management thereof by enterprise IT administrators. As an ever-present overlay network, the cloud-based system 100 can provide the same functions as the physical devices and/or appliances regardless of geography or location of the users 102, as well as independent of platform, operating system, network access technique, network access provider, etc. The cloud-based system 100 can be viewed as providing Zero Trust Network Access (ZTNA).

There are various techniques to forward traffic between the users 102 at the locations 112, 114, 118, and via the devices 110, 116, and the cloud-based system 100. Typically, the locations 112, 114, 118 can use tunneling where all traffic is forward through the cloud-based system 100. For example, various tunneling protocols are contemplated, such as GRE, L2TP, IPsec, customized tunneling protocols, etc. The devices 110, 116, when not at one of the locations 112,

114, 118 can use a local application that forwards traffic, a proxy such as via a Proxy Auto-Config (PAC) file, and the like. An application of the local application is the application 350 described in detail herein as a connector application. A key aspect of the cloud-based system 100 is all traffic between the users 102 and the Internet 104 or the cloud services 106 is via the cloud-based system 100. As such, the cloud-based system 100 has visibility to enable various functions, all of which are performed off the user device in the cloud.

The cloud-based system 100 can also include a management system 120 for tenant access to provide global policy and configuration as well as real-time analytics. This enables IT administrators to have a unified view of user activity, threat intelligence, application usage, etc. For example, IT administrators can drill-down to a per-user level to understand events and correlate threats, to identify compromised devices, to have application visibility, and the like. The cloud-based system 100 can further include connectivity to an Identity Provider (IDP) 122 for authentication of the users 102 and to a Security Information and Event Management (SIEM) system 124 for event logging. The system 124 can provide alert and activity logs on a per-user 102 basis.

Figure 2:
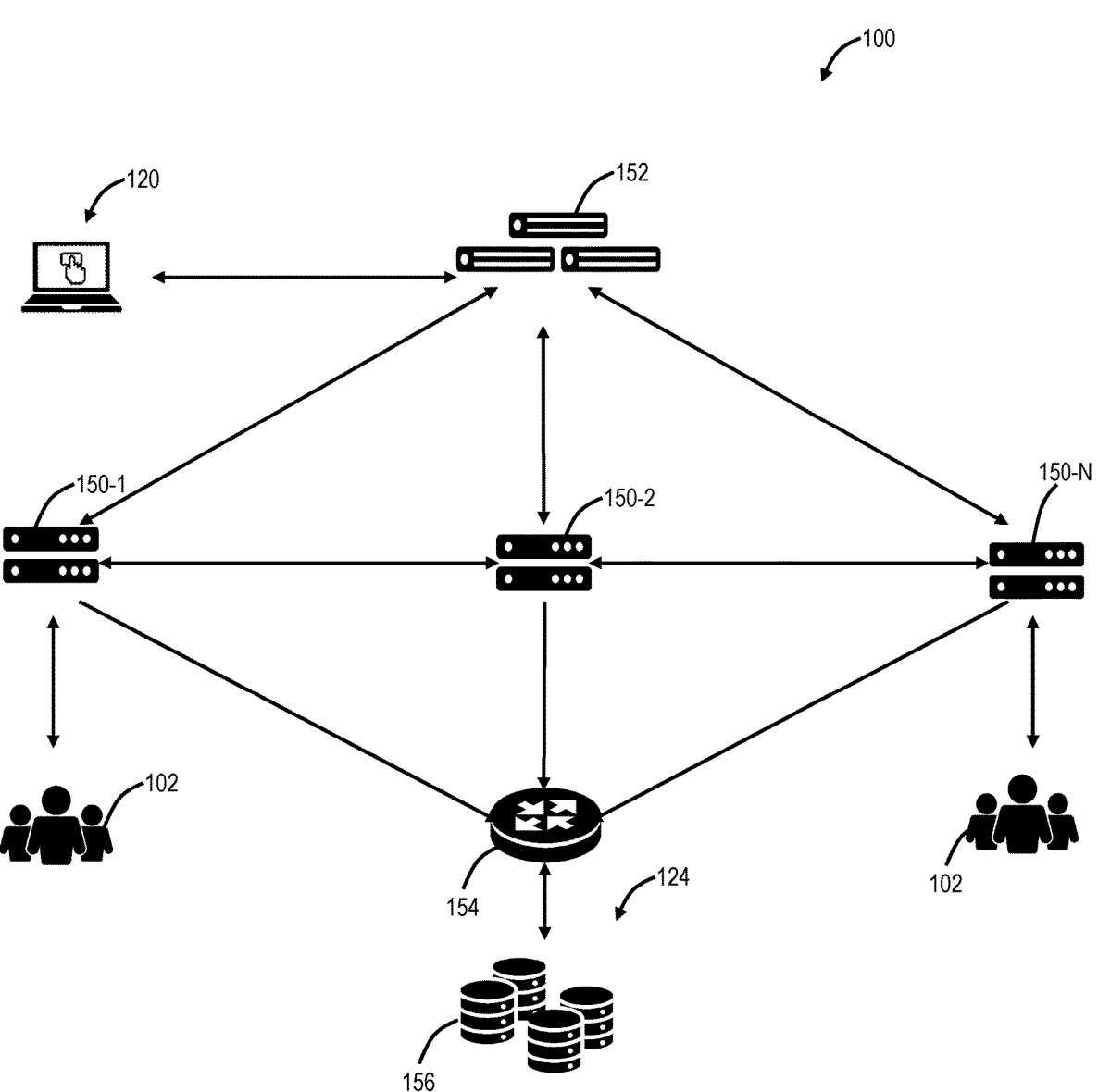
FIG. 2 is a network diagram of an example implementation of the cloud-based system.
Figure 4:
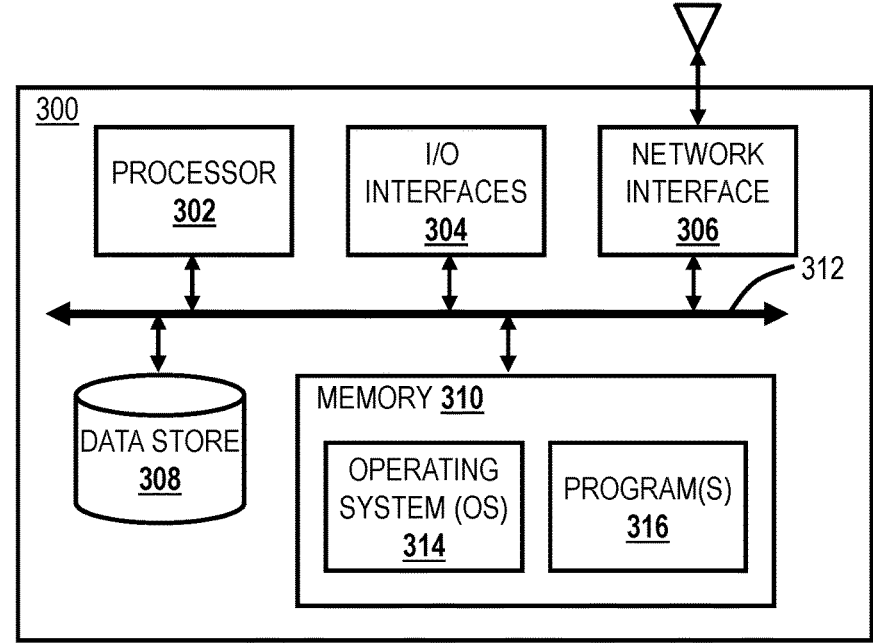

FIG. 2 is a network diagram of an example implementation of the cloud-based system 100. In an embodiment, the cloud-based system 100 includes a plurality of enforcement nodes (EN) 150, labeled as enforcement nodes 150-1, 150-2, 150-N, interconnected to one another and interconnected to a central authority (CA) 152. Note, the nodes 150 are called "enforcement" nodes 150 but they can be simply referred to as nodes 150 in the cloud-based system 100. Also, the nodes 150 can be referred to as service edges. The nodes 150 and the central authority 152, while described as nodes, can include one or more servers, including physical servers, virtual machines (VM) executed on physical hardware, etc. An example of a server is illustrated in FIG. 4. The cloud-based system 100 further includes a log router 154 that connects to a storage cluster 156 for supporting log maintenance from the enforcement nodes 150. The central authority 152 provide centralized policy, real-time threat updates, etc. and coordinates the distribution of this data between the enforcement nodes 150. The enforcement nodes 150 provide an onramp to the users 102 and are configured to execute policy, based on the central authority 152, for each user 102. The enforcement nodes 150 can be geographically distributed, and the policy for each user 102 follows that user 102 as he or she connects to the nearest (or other criteria) enforcement node 150. Of note, the cloud-based system is an external system meaning it is separate from tenant's private networks (enterprise networks) as well as from networks associated with the devices 110, 116, and locations 112, 118.

The enforcement nodes 150 are full-featured secure internet gateways that provide integrated internet security. They inspect all web traffic bi-directionally for malware and enforce security, compliance, and firewall policies, as described herein, as well as various additional functionality. In an embodiment, each enforcement node 150 has two main modules for inspecting traffic and applying policies: a web module and a firewall module. The enforcement nodes 150 are deployed around the world and can handle hundreds of thousands of concurrent users with millions of concurrent sessions. Because of this, regardless of where the users 102 are, they can access the Internet 104 from any device, and the enforcement nodes 150 protect the traffic and apply corporate policies. The enforcement nodes 150 can implement various inspection engines therein, and optionally, send sandboxing to another system. The enforcement nodes 150 include significant fault tolerance capabilities, such as deployment in active-active mode to ensure availability and redundancy as well as continuous monitoring.

In an embodiment, customer traffic is not passed to any other component within the cloud-based system 100, and the enforcement nodes 150 can be configured never to store any data to disk. Packet data is held in memory for inspection and then, based on policy, is either forwarded or dropped. Log data generated for every transaction is compressed, tokenized, and exported over secure Transport Layer Security (TLS) connections to the log routers 154 that direct the logs to the storage cluster 156, hosted in the appropriate geographical region, for each organization. In an embodiment, all data destined for or received from the Internet is processed through one of the enforcement nodes 150. In another embodiment, specific data specified by each tenant, e.g., only email, only executable files, etc., is processed through one of the enforcement nodes 150.

Each of the enforcement nodes 150 may generate a decision vector D=[d1, d2, . . . , dn] for a content item of one or more parts C=[c1, c2, . . . , cm]. Each decision vector may identify a threat classification, e.g., clean, spyware, malware, undesirable content, innocuous, spam email, unknown, etc. For example, the output of each element of the decision vector D may be based on the output of one or more data inspection engines. In an embodiment, the threat classification may be reduced to a subset of categories, e.g., violating, non-violating, neutral, unknown. Based on the subset classification, the enforcement node 150 may allow the distribution of the content item, preclude distribution of the content item, allow distribution of the content item after a cleaning process, or perform threat detection on the content item. In an embodiment, the actions taken by one of the enforcement nodes 150 may be determinative on the threat classification of the content item and on a security policy of the tenant to which the content item is being sent from or from which the content item is being requested by. A content item is violating if, for any part C=[c1, c2, . . . , cm] of the content item, at any of the enforcement nodes 150, any one of the data inspection engines generates an output that results in a classification of "violating."

The central authority 152 hosts all customer (tenant) policy and configuration settings. It monitors the cloud and provides a central location for software and database updates and threat intelligence. Given the multi-tenant architecture, the central authority 152 is redundant and backed up in multiple different data centers. The enforcement nodes 150 establish persistent connections to the central authority 152 to download all policy configurations. When a new user connects to an enforcement node 150, a policy request is sent to the central authority 152 through this connection. The central authority 152 then calculates the policies that apply to that user 102 and sends the policy to the enforcement node 150 as a highly compressed bitmap.

The policy can be tenant-specific and can include access privileges for users, websites and/or content that is disallowed, restricted domains, DLP dictionaries, etc. Once downloaded, a tenant's policy is cached until a policy change is made in the management system 120. The policy can be tenant-specific and can include access privileges for users, websites and/or content that is disallowed, restricted domains, DLP dictionaries, etc. When this happens, all of the cached policies are purged, and the enforcement nodes 150 request the new policy when the user 102 next makes a request. In an embodiment, the enforcement node 150 exchange "heartbeats" periodically, so all enforcement nodes 150 are informed when there is a policy change. Any enforcement node 150 can then pull the change in policy when it sees a new request.

The cloud-based system 100 can be a private cloud, a public cloud, a combination of a private cloud and a public cloud (hybrid cloud), or the like. Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase "Software as a Service" (SaaS) is sometimes used to describe application programs offered through cloud computing. A common shorthand for a provided cloud computing service (or even an aggregation of all existing cloud services) is "the cloud." The cloud-based system 100 is illustrated herein as an example embodiment of a cloud-based system, and other implementations are also contemplated.

As described herein, the terms cloud services and cloud applications may be used interchangeably. The cloud service 106 is any service made available to users on-demand via the Internet, as opposed to being provided from a company's on-premises servers. A cloud application, or cloud app, is a software program where cloud-based and local components work together. The cloud-based system 100 can be utilized to provide example cloud services, including Zscaler Internet Access (ZIA), Zscaler Private Access (ZPA), and Zscaler Digital Experience (ZDX), all from Zscaler, Inc. (the assignee and applicant of the present application). Also, there can be multiple different cloud-based systems 100, including ones with different architectures and multiple cloud services. The ZIA service can provide the access control, threat prevention, and data protection described above with reference to the cloud-based system 100. ZPA can include access control, microservice segmentation, etc. The ZDX service can provide monitoring of user experience, e.g., Quality of Experience (QoE), Quality of Service (QoS), etc., in a manner that can gain insights based on continuous, inline monitoring. For example, the ZIA service can provide a user with Internet Access, and the ZPA service can provide a user with access to enterprise resources instead of traditional Virtual Private Networks (VPNs), namely ZPA provides Zero Trust Network Access (ZTNA). Those of ordinary skill in the art will recognize various other types of cloud services 106 are also contemplated. Also, other types of cloud architectures are also contemplated, with the cloud-based system 100 presented for illustration purposes.

§ 1.1 Private Nodes Hosted by Tenants or Service Providers

The nodes 150 that service multi-tenant users 102 may be located in data centers. These nodes 150 can be referred to as public nodes 150 or public service edges. In embodiment, the nodes 150 can be located on-premises with tenants (enterprise) as well as service providers. These nodes can be referred to as private nodes 150 or private service edges. In operation, these private nodes 150 can perform the same functions as the public nodes 150, can communicate with the central authority 152, and the like. In fact, the private nodes 150 can be considered in the same cloud-based system 100 as the public nodes 150, except located on-premises. When a private node 150 is located in an enterprise network, the private node 150 can be single tenant for the corresponding enterprise; of course, the cloud-based system 100 is still multi-tenant, but these particular nodes are serving only a single tenant. When a private node 150 is located in a service provider's network, the private node 150 can be multi-tenant for customers of the service provider. Those skilled in the are will recognize various architectural approaches are contemplated. The cloud-based system 100 is a logical construct providing a security service.

2.0 USER DEVICE APPLICATION FOR TRAFFIC FORWARDING AND MONITORING

Figure 3:
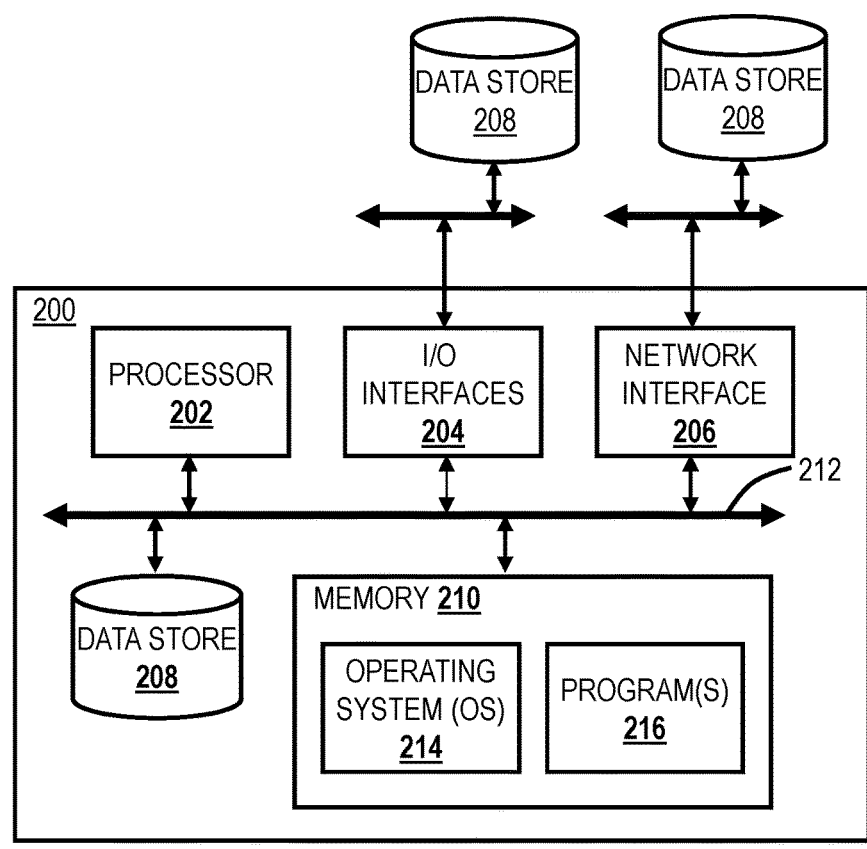

FIG. 3 is a network diagram of the cloud-based system 100 illustrating an application 350 on user devices 300 with users 102 configured to operate through the cloud-based system 100. Different types of user devices 300 are proliferating, including Bring Your Own Device (BYOD) as well as IT-managed devices. The conventional approach for a user device 300 to operate with the cloud-based system 100 as well as for accessing enterprise resources includes complex policies, VPNs, poor user experience, etc. The application 350 can automatically forward user traffic with the cloud-based system 100 as well as ensuring that security and access policies are enforced, regardless of device, location, operating system, or application. The application 350 automatically determines if a user 102 is looking to access the open Internet 104, a SaaS app, or an internal app running in public, private, or the datacenter and routes mobile traffic through the cloud-based system 100. The application 350 can support various cloud services, including ZIA, ZPA, ZDX, etc., allowing the best-in-class security with zero trust access to internal apps. As described herein, the application 350 can also be referred to as a connector application.

The application 350 is configured to auto-route traffic for seamless user experience. This can be protocol as well as application-specific, and the application 350 can route traffic with a nearest or best fit enforcement node 150. Further, the application 350 can detect trusted networks, allowed applications, etc. and support secure network access. The application 350 can also support the enrollment of the user device 300 prior to accessing applications. The application 350 can uniquely detect the users 102 based on fingerprinting the user device 300, using criteria like device model, platform, operating system, etc. The application 350 can support Mobile Device Management (MDM) functions, allowing IT personnel to deploy and manage the user devices 300 seamlessly. This can also include the automatic installation of client and SSL certificates during enrollment. Finally, the application 350 provides visibility into device and app usage of the user 102 of the user device 300.

The application 350 supports a secure, lightweight tunnel between the user device 300 and the cloud-based system 100. For example, the lightweight tunnel can be HTTP-based. With the application 350, there is no requirement for PAC files, an IPsec VPN, authentication cookies, or user 102 setup.

3.0 EXAMPLE SERVER ARCHITECTURE

FIG. 4 is a block diagram of a server 200, which may be used in the cloud-based system 100, in other systems, or standalone. For example, the enforcement nodes 150 and the central authority 152 may be formed as one or more of the servers 200. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 4 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a Central Processing Unit (CPU), an auxiliary processor among several processors associated with the server 200, a semiconductor-based microprocessor (in the form of a microchip or chipset), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components.

The network interface 206 may be used to enable the server 200 to communicate on a network, such as the Internet 104. The network interface 206 may include, for example, an Ethernet card or adapter or a Wireless Local Area Network (WLAN) card or adapter. The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof.

Moreover, the data store 208 may incorporate electronic, magnetic, optical, and/or other types of storage media. In one example, the data store 208 may be located internal to the server 200, such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable Operating System (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

4.0 EXAMPLE USER DEVICE ARCHITECTURE

FIG. 5 is a block diagram of a user device 300, which may be used with the cloud-based system 100 or the like. Specifically, the user device 300 can form a device used by one of the users 102, and this may include common devices such as laptops, smartphones, tablets, netbooks, personal digital assistants, MP3 players, cell phones, e-book readers, IoT devices, servers, desktops, printers, televisions, streaming media devices, and the like. The user device 300 can be a digital device that, in terms of hardware architecture, generally includes a processor 302, I/O interfaces 304, a network interface 306, a data store 308, and memory 310. It should be appreciated by those of ordinary skill in the art that FIG. 5 depicts the user device 300 in an oversimplified manner, and a practical embodiment may include additional components and suitably configured processing logic to support known or conventional operating features that are not described in detail herein. The components (302, 304, 306, 308, and 302) are communicatively coupled via a local interface 312. The local interface 312 can be, for example, but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 can be any custom made or commercially available processor, a CPU, an auxiliary processor among several processors associated with the user device 300, a semiconductor-based microprocessor (in the form of a microchip or chipset), or generally any device for executing software instructions. When the user device 300 is in operation, the processor 302 is configured to execute software stored within the memory 310, to communicate data to and from the memory 310, and to generally control operations of the user device 300 pursuant to the software instructions. In an embodiment, the processor 302 may include a mobile optimized processor such as optimized for power consumption and mobile applications. The I/O interfaces 304 can be used to receive user input from and/or for providing system output. User input can be provided via, for example, a keypad, a touch screen, a scroll ball, a scroll bar, buttons, a barcode scanner, and the like. System output can be provided via a display device such as a Liquid Crystal Display (LCD), touch screen, and the like.

The network interface 306 enables wireless communication to an external access device or network. Any number of suitable wireless data communication protocols, techniques, or methodologies can be supported by the network interface 306, including any protocols for wireless communication. The data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

The memory 310 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another but can be accessed by the processor 302. The software in memory 310 can include one or more software programs, each of which includes an ordered listing of executable instructions for implementing logical functions. In the example of FIG. 3, the software in the memory 310 includes a suitable operating system 314 and programs 316. The operating system 314 essentially controls the execution of other computer programs and provides scheduling, input-output control, file and data management, memory management, and communication control and related services. The programs 316 may include various applications, add-ons, etc. configured to provide end user functionality with the user device 300. For example, example programs 316 may include, but not limited to, a web browser, social networking applications, streaming media applications, games, mapping and location applications, electronic mail applications, financial applications, and the like. In a typical example, the end-user typically uses one or more of the programs 316 along with a network such as the cloud-based system 100.

5.0 CLOUD TUNNEL

Figure 6:
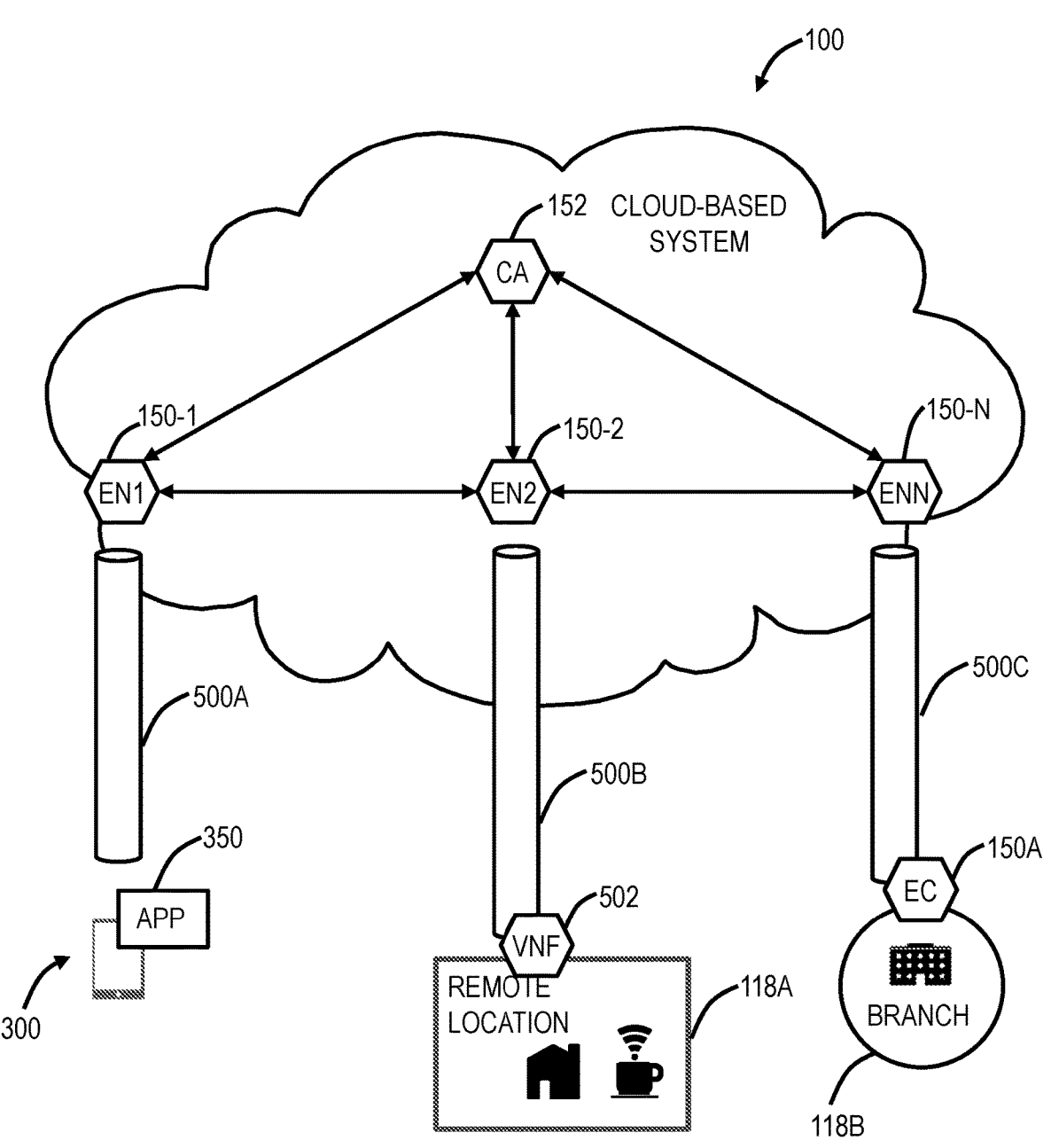
FIG. 6 is a network diagram of the cloud-based system of FIGS. 1 and 2 with various cloud tunnels, labeled as cloud tunnels, for forwarding traffic.
Figure 7:
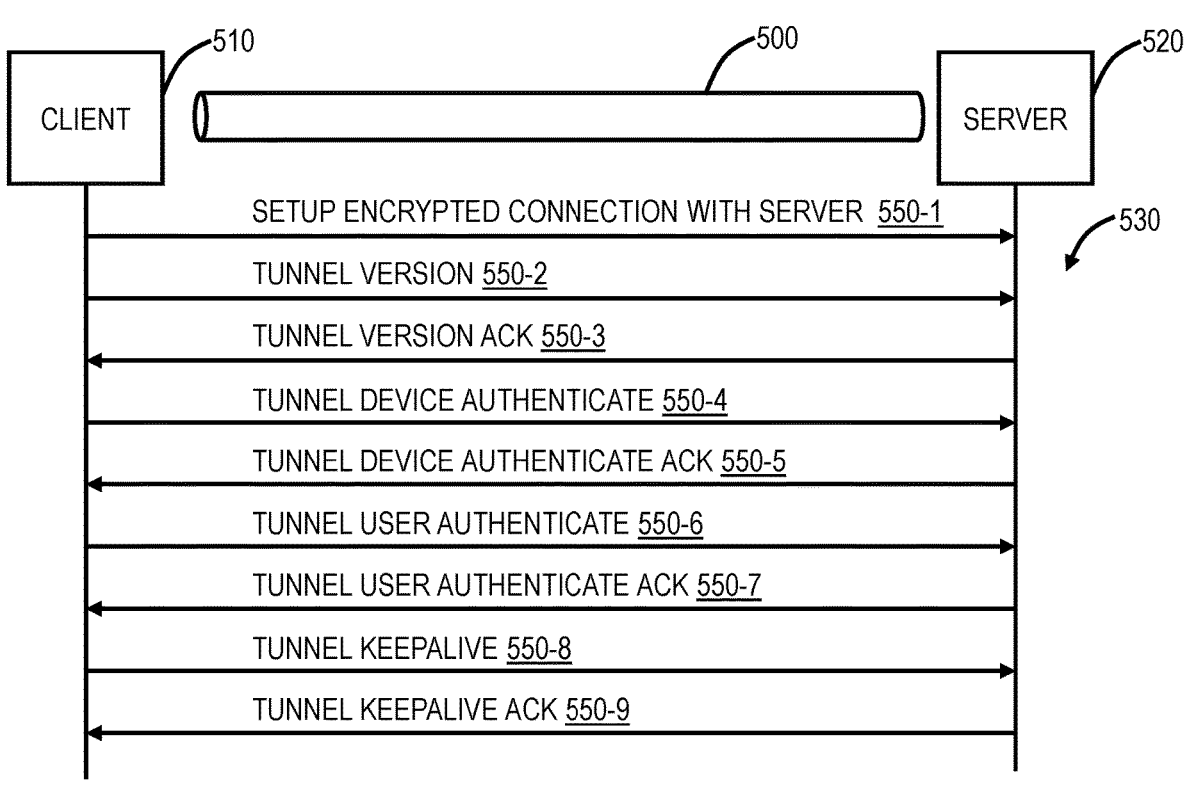
FIGS. 7 and 8 are flow diagrams of a cloud tunnel illustrating a control channel (FIG. 7) and a data channel (FIG. 8), with the tunnel illustrated between a client and a server.
Figure 8:
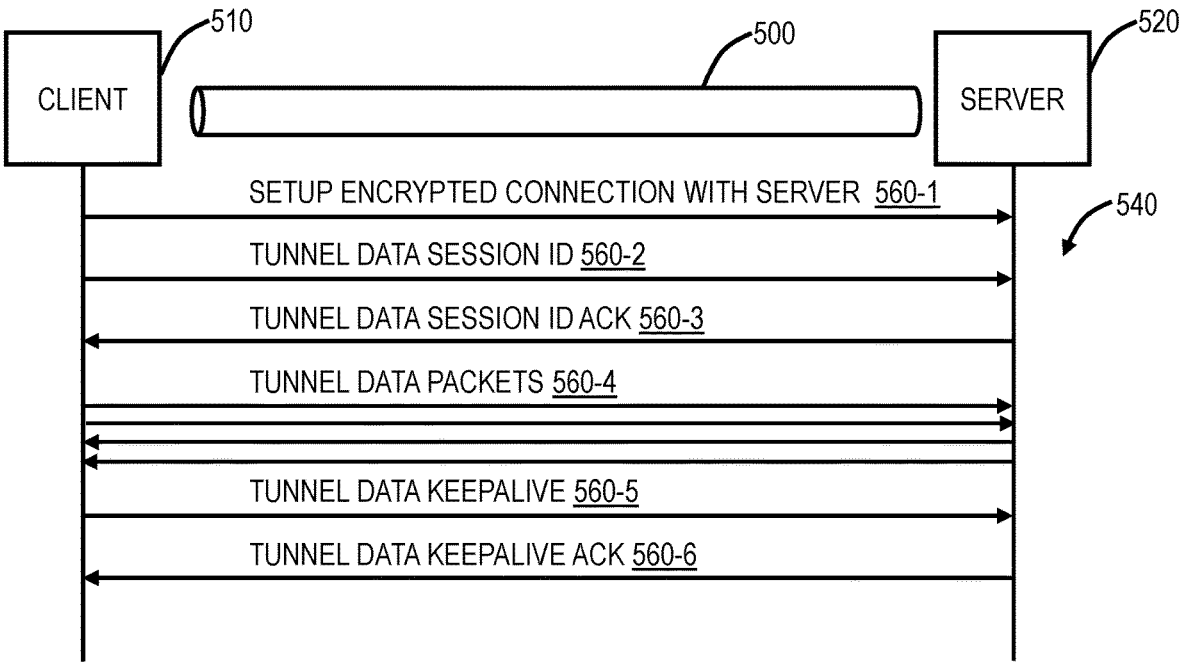

FIG. 6 is a network diagram of the cloud-based system 100 with various cloud tunnels 500, labeled as cloud tunnels 500A, 500B, 500C, for forwarding traffic. FIGS. 7 and 8 are flow diagrams of a cloud tunnel 500 illustrating a control channel (FIG. 7) and a data channel (FIG. 8), with the tunnel illustrated between a client 510 and a server 520. The cloud tunnel 500 is a lightweight tunnel that is configured to forward traffic between the client 510 and the server 520. The present disclosure focuses on the specific mechanisms used in the cloud tunnel 500 between two points, namely the client 510 and the server 520. Those skilled in the art will recognize the cloud tunnel 500 can be used with the cloud-based system 100 as an example use case, and other uses are contemplated. That is, the client 510 and the server 520 are just endpoint devices that support the exchange of data traffic and control traffic for the tunnel 500. For description, the server 520 can be referred to as a local node and the client 510 as a remote node, where the tunnel operates between the local and remote nodes.

In an embodiment, the cloud-based system 100 can use the cloud tunnel 500 to forward traffic to the enforcement nodes 150, such as from a user device 300 with the application 350, from a branch office/remote location 118, etc.

FIG. 6 illustrates three example use cases for the cloud tunnel 500 with the cloud-based system 100, and other uses are also contemplated. In a first use case, a cloud tunnel 500A is formed between a user device 300, such as with the application 350, and an enforcement node 150-1. For example, when a user 102 associated with the user device 300 connects to a network, the application 350 can establish the cloud tunnel 500A to the closest or best enforcement node 150-1 and forward the traffic through the cloud tunnel 500A so that the enforcement node 150-1 can apply the appropriate security and access policies. Here, the cloud tunnel 500A supports a single user 102, associated with the user device 300.

In a second use case, a cloud tunnel 500B is formed between a Virtual Network Function (VNF) 502 or some other device at a remote location 118A and an enforcement node 150-2. Here, the VNF 502 is used to forward traffic from any user 102 at the remote location 118A to the enforcement node 150-2. In a third use case, a cloud tunnel 110C is formed between an on-premises enforcement node, referred to as an Edge Connector (EC) 150A, and an enforcement node 150-N. The edge connector 150A can be located at a branch office 118A or the like. In some embodiments, the edge connector 150A can be an enforcement node 150 in the cloud-based system 100 but located on-premises with a tenant. Here, in the second and third use cases, the cloud tunnels 500B, 500C support multiple users 102.

There can be two versions of the cloud tunnel 500, referred to a tunnel 1 and tunnel 2. The tunnel 1 can only support Web protocols as an HTTP connect tunnel operating on a Transmission Control Protocol (TCP) streams. That is, the tunnel 1 can send all proxy-aware traffic or port 80/443 traffic to the enforcement node 150, depending on the forwarding profile configuration. This can be performed via CONNECT requests, similar to a traditional proxy.

The tunnel 2 can support multiple ports and protocols, extending beyond only web protocols. As described herein, the cloud tunnels 500 are the tunnel 2. In all of the use cases, the cloud tunnel 500 enables each user device 300 to redirect traffic destined to all ports and protocols to a corresponding enforcement node 150. Note, the cloud-based system 100 can include load balancing functionality to spread the cloud tunnels 500 from a single source IP address. The cloud tunnel 500 supports device logging for all traffic, firewall, etc., such as in the storage cluster 156. The cloud tunnel 500 utilizes encryption, such as via TLS or Datagram TLS (DTLS), to tunnel packets between the two points, namely the client 510 and the server 520. As described herein, the client 510 can be the user device 300, the VNF 502, and/or the edge connector 150A, and the server 520 can be the enforcement node 150. Again, other devices are contemplated with the cloud tunnel 500.

The cloud tunnel 500 can use a Network Address Translation (NAT) device that does not require a different egress IP for each device's 300 separate sessions. Again, the cloud tunnel 500 has a tunneling architecture that uses DTLS or TLS to send packets to the cloud-based system 100. Because of this, the cloud tunnel 500 is capable of sending traffic from all ports and protocols.

Thus, the cloud tunnel 500 provides complete protection for a single user 102, via the application 350, as well as for multiple users at remote locations 118, including multiple security functions such as cloud firewall, cloud IPS, etc. The cloud tunnel 500 includes user-level granularity of the traffic, enabling different users 102 on the same cloud tunnel 500 for the enforcement nodes 150 to provide user-based granular policy and visibility. In addition to user-level granularity, the cloud tunnel 500 can provide application-level granularity, such as by mapping mobile applications (e.g., Facebook, Gmail, etc.) to traffic, allowing for app-based granular policies.

FIGS. 7 and 8 illustrate the two communication channels, namely a control channel 530 and a data channel 540, between the client 510 and the server 520. Together, these two communication channels 530,540 form the cloud tunnel 500. In an embodiment, the control channel 530 can be an encrypted TLS connection or SSL connection, and the control channel 530 is used for device and/or user authentication and other control messages. In an embodiment, the data channel 540 can be an encrypted DTLS or TLS connection, i.e., the data channel can be one or more DTLS or TLS connections for the transmit and receive of user IP packets. There can be multiple data channels 540 associated with the same control channel 530. The data channel 540 can be authenticated using a Session Identifier (ID) from the control channel 530.

Of note, the control channel 530 always uses TLS because some locations (e.g., the remote location 118A, the branch office 118B, other enterprises, hotspots, etc.) can block UDP port 443, preventing DTLS. Whereas TLS is widely used and not typically blocked. The data channel 540 preferably uses DTLS, if it is available, i.e., not blocked on the client 510. If it is blocked, the data channel 540 can use TLS instead. For example, DTLS is the primary protocol for the data channel 540 with TLS used as a fallback over TCP port 443 if DTLS is unavailable, namely if UDP port 443 is blocked at the client 510.

In FIG. 7, the control channel 530 is illustrated with exchanges between the client 510 and the server 520. Again, the control channel 530 includes TLS encryption, which is established through a setup or handshake between the client 510 and the server 520 (step 550-1). The client 510 can send its version of the tunnel 500 to the server 520 (step 550-2) to which the server 520 can acknowledge (step 550-3). For example, the version of the tunnel can include a simple version number or other indication, as well as an indication of whether the client 510 supports DTLS for the data channel 540. Again, the control channel 530 is fixed with TLS or SSL, but the data channel 540 can be either DTLS or TLS.

The client 510 can perform device authentication (step 550-4), and the server 520 can acknowledge the device authentication (step 550-5). The client 510 can perform user authentication (step 550-6), and the server 520 can acknowledge the user authentication (step 550-7). Note, the device authentication includes authenticating the user device 300, such as via the application 350, the VNF 502, the edge connector 150A, etc. The user authentication includes authenticating the users 102 associated with the user devices 300. Note, in an embodiment, the client 510 is the sole device 300, and here the user authentication can be for the user 102 associated with the client 510, and the device authentication can be for the user device 300 with the application 350. In another embodiment, the client 510 can have multiple user devices 300 and corresponding users 102 associated with it. Here, the device authentication can be for the VNF 502, the edge connector 150A, etc., and the user authentication can be for each user device 300 and corresponding user 102, and the client 510 and the server 520 can have a unique identifier for each user device 300, for user-level identification.

The device authentication acknowledgment can include a session identifier (ID) that is used to bind the control channel 530 with one or more data channels 540. The user authentication can be based on a user identifier (ID) that is unique to each user 102. The client 510 can periodically provide keep alive packets (step 550-8), and the server 520 can respond with keep alive acknowledgment packets (step 550-9). The client 510 and the server 520 can use the keep alive packets or messages to maintain the control channel 530. Also, the client 510 and the server 520 can exchange other relevant data over the control channel 530, such as metadata, which identifies an application for a user 102, location information for a user device 300, etc.

Figure 11:
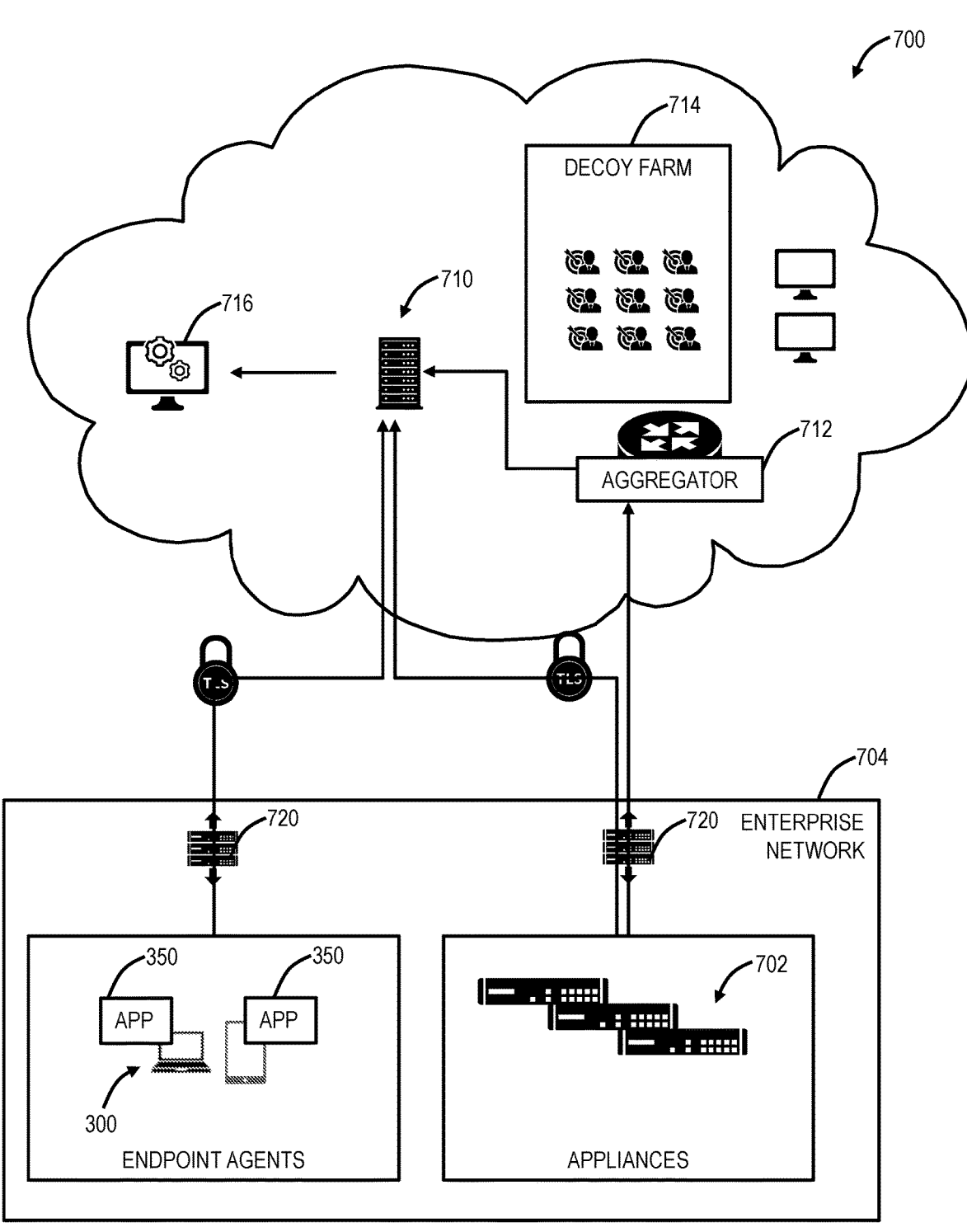
FIG. 11 is a network diagram of a deception system with endpoint agents such as the application and with appliances in an enterprise network.

In FIG. 8, similar to FIG. 7, the data channel 540 is illustrated with exchanges between the client 510 and the server 520. Again, the data channel 540 includes TLS or DTLS encryption, which is established through a setup or handshake between the client 510 and the server 520 (step 560-1). An example of a handshake is illustrated in FIG. 11. Note, the determination of whether to use TLS or DTLS is based on the session ID, which is part of the device authentication acknowledgment, and which is provided over the data channel 540 (steps 560-2, 560-3). Here, the client 510 has told the server 520 its capabilities, and the session ID reflects what the server 520 has chosen, namely TLS or DTLS, based on the client's 510 capabilities. In an embodiment, the server 520 chooses DTLS if the client 510 supports it, i.e., if UDP port 443 is not blocked, otherwise the server 520 chooses TLS. Accordingly, the control channel 530 is established before the data channel 540. The data channel 540 can be authenticated based on the session ID from the control channel 530.

The data channel 540 includes the exchange of data packets between the client 510 and the server 520 (step 560-4). The data packets include an identifier such as the session ID and a user ID for the associated user 102. Additionally, the data channel 540 can include keep alive packets between the client 510 and the server 520 (steps 560-5, 560-6).

The cloud tunnel 500 can support load balancing functionality between the client 510 and the server 520. The server 520 can be in a cluster, i.e., multiple servers 200. For example, the server 520 can be an enforcement node 150 cluster in the cloud-based system 100. Because there can be multiple data channels 540 for a single control channel 530, it is possible to have the multiple data channels 540, in a single cloud tunnel 500, connected to different physical servers 200 in a cluster. Thus, the cloud-based system 100 can include load balancing functionality to spread the cloud tunnels 500 from a single source IP address, i.e., the client 510.

Also, the use of DTLS for the data channels 540 allows the user devices 300 to switch networks without potentially impacting the traffic going through the tunnel 500. For example, a large file download could continue uninterrupted when a user device 300 moves from Wi-Fi to mobile, etc. Here, the application 350 can add some proprietary data to the DTLS client-hello server name extension. That proprietary data helps a load balancer balance the new DTLS connection to the same server 200 in a cluster where the connection prior to network change was being processed. So, a newly established DTLS connection with different IP address (due to network change) can be used to tunnel packets of the large file download that was started before the network change. Also, some mobile carriers use different IP addresses for TCP/TLS (control channel) and UDP/DTLS (data channel) flows. The data in DTLS client-hello helps the load balancer balance the control and data connection to the same server 200 in the cluster.

6.0 CLOUD CONNECTIVITY

Figure 9:
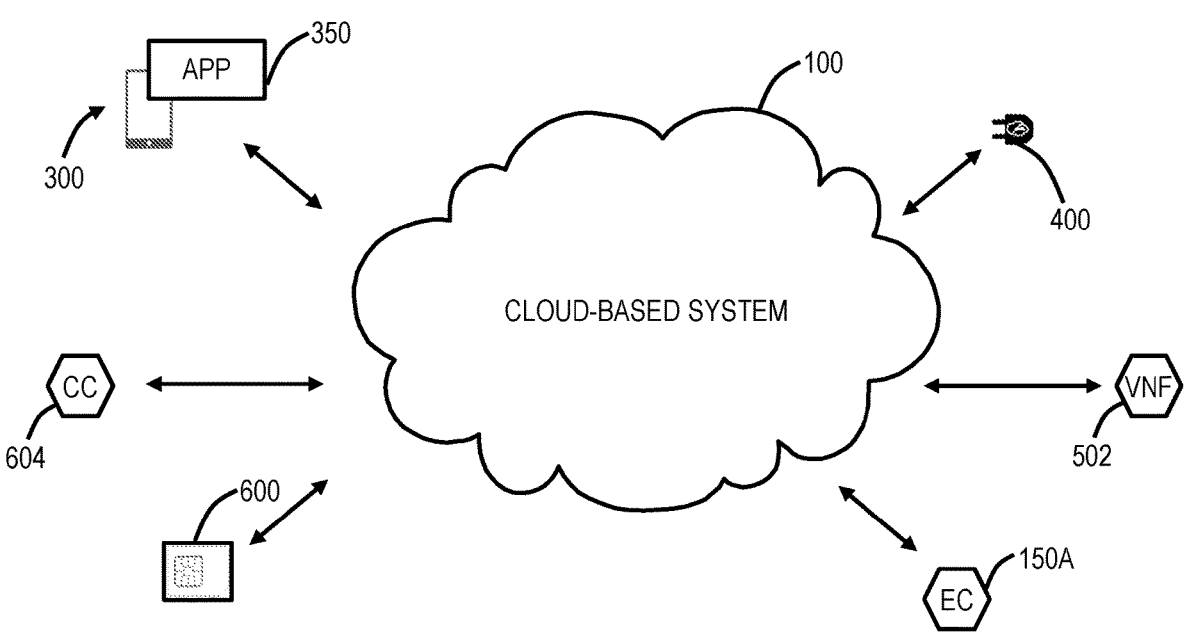
FIG. 9 is a diagram illustrating various techniques to forward traffic to the cloud-based system.

FIG. 9 is a diagram illustrating various techniques to forward traffic to the cloud-based system 100. These include, for example, use of the application 350 as a client connector for forwarding traffic, use of the connector 400 app, use of the VNF 502 or some other device, use of the edge connector 150A, and use of an eSIM/iSIM/SIM-card 600. The application 350 can be referred to as a client connector and it is via a native application executed on the user device 300 as well as being user ID-based. The connector 400 can be referred to as an app connector. The edge connector 150A can be referred to as a private service edge.

There is a requirement to get any customer traffic to/from the cloud-based system 100. However, there is a gap on some devices. The current approach, e.g., with the application 350, the connector 400, etc. there is a reliance on the device, namely installation of a forwarding app, a reliance on an operating system, namely virtual interfaces, and a reliance on forwarding gateways, namely the edge connector 150A. However, these may not be available with other types of devices such as IoT devices and the like. As described herein, the present disclosure utilizes the term client device to include, without limitations IoT devices (e.g., smart scooters, etc.), Operational Technology (OT) platforms (e.g., Supervisory Control and Data Acquisition (SCADA) systems, Industrial Control Systems (ICS), etc.), medical equipment (e.g., CAT and MRI scanners, etc.), connected vehicles, and practically any device that has a Subscriber Identification Module (SIM) in the form of a card, an eSIM, or an iSIM. Those skilled in the art will recognize that a client device differs from the user device 300 as it may not have the ability to implement the application 350, not support a user ID for identifying the user 102, etc.

The present disclosure includes two additional techniques for cloud connectivity for IoT devices including an eSIM/iSIM/SIM-card 600 based approach and a cloud/branch/thing connector 604. The ESIM/iSIM/SIM-card 600 based approach can be referred to as a device connector. The ESIM/iSIM/SIM-card 600 based approach is used for forwarding traffic from any SIM-based device (e.g., 2G to 5G and beyond). The key here is identity is based on the ESIM/iSIM/SIM-card 600, namely the International Mobile Equipment Identity (IMEI), as opposed to a user ID.

The connection between the cloud-based system 100 and on-premises connector 400 is dynamic, on-demand, and orchestrated by the cloud-based system 100. A key feature is its security at the edge—there is no need to punch any holes in the existing on-premises firewall. The connector 400 inside the enterprise or the like (on-premises) "dials out" and connects to the cloud-based system 100 as if too were an endpoint. This on-demand dial-out capability and tunneling authenticated traffic back to the enterprise is a key differentiator for ZTNA. The app connector 400 is used for virtual private access. The paradigm of virtual private access systems and methods is to give users network access to get to an application and/or file share, not to the entire network. If a user is not authorized to get the application, the user should not be able even to see that it exists, much less access it. The virtual private access systems and methods provide an approach to deliver secure access by decoupling applications 402, 404 from the network, instead of providing access with a connector 400, in front of the applications 402, 404, an application on the user device 300, a central authority 152 to push policy, and the cloud-based system 100 to stitch the applications 402, 404 and the software connectors 400 together, on a per-user, per-application basis.

With the virtual private access, users can only see the specific applications 402, 404 allowed by the central authority 152. Everything else is "invisible" or "dark" to them. Because the virtual private access separates the application from the network, the physical location of the application 402, 404 becomes irrelevant—if applications 402, 404 are located in more than one place, the user is automatically directed to the instance that will give them the best performance. The virtual private access also dramatically reduces configuration complexity, such as policies/firewalls in the data centers. Enterprises can, for example, move applications to Amazon Web Services or Microsoft Azure, and take advantage of the elasticity of the cloud, making private, internal applications behave just like the marketing leading enterprise applications. Advantageously, there is no hardware to buy or deploy because the virtual private access is a service offering to end-users and enterprises.

7.0 DECEPTION TECHNOLOGY

As attacks become more advanced, deception technology is becoming critical for early threat detection. Deception technology is a simple but effective approach to budding security defenses that detect threats early with low false positives and minimal performance impact on the network. The technology works by creating decoys—realistic-but-fake assets (domains, databases, servers, applications, files, credentials, cookies, sessions, network traffic and more) that are deployed in an enterprise IT environment alongside legitimate assets. For an attacker who has breached the network, there is no way to differentiate the fake from the real. The moment they interact with a decoy, a silent alarm is raised while the systems collect information on the attacker's actions and intent. As described herein, the term "decoy" can be used interchangeably with breadcrumbs, honeypots, fake assets, lures, honeytokes, bait etc.

Modern-day deception technology-based cybersecurity defenses borrow heavily from proven military deception use of deceit, camouflage, and subterfuge. In the context of cybersecurity, defenders use decoys and lures to mislead attackers into believing that they have a foothold in the network and revealing themselves. The beauty of this approach lies in its simplicity.

Picture two adversaries with comparable capabilities but differing goals facing off against each other. The odds of either of them winning are usually at a coin toss. What if one of the two had the benefit of speed, flexibility, and targeted information? It is no contest. The speedier, more nimble of the adversaries will usually outcompete their opponent. Even so, the latter has greater strength and access to more information. Because the opponent with more information falls into 'analysis paralysis.' They have so much information that analyzing all of it becomes infeasible and some information must be prioritized over the rest. This is how adversaries lacking in strength usually win an adversarial contest.

Something very similar happens in cybersecurity. Consider for a minute how things have played out over the past couple of decades. Attacker: Let's play a game with some simple rules. I'll try to access your information or other resources. If I'm successful once, I win. Defender: Sounds fair. Attacker: If you prevent me from being able to reach my target at any time including otherwise rough or busy days, after-hours, on weekends and holidays . . . you win. This is a rigged game. As a defender, you need to be right 100% of the time. The attacker just has to be right once. Thankfully, deception flips the table by placing the burden of success on the attackers instead. Once you populate your network with decoys, adversaries need to carry out a flawless attack without interacting with any deceptive assets, triggering any detection controls, or prompting other defensive actions, to succeed in their attack. In other words, the attacker now needs to be right 100% of the time, while a single mistake hands the defenders a win.

Deception technology is attack-vector-agnostic. It only ever looks at the intent of the adversary to detect attacks. No legitimate user has any business accessing a decoy system, file or application. Therefore, by design, any interaction with a decoy is suspicious at a minimum and malicious at worst. Since deception-based defenses do not depend on signatures or heuristics for detection, they are able to detect virtually any attack including APTs, zero-days, reconnaissance, lateral movement, malwareless attacks, social engineering, man-in-the-middle attacks, and ransomware in real-time. Decoys are essentially zero trust, they assume all interaction is by default malicious or suspicious.

Against the vast majority of adversaries, deception is extremely effective because it leverages the fact that they do not know everything about the network they are trying to move around. Since decoys are essentially just another asset in the network and their strength is functional and not technical, differentiating them from legitimate assets is virtually impossible. Further, by injecting fake records in a user's browser history, password manager, and other common points of internal reconnaissance, the attacker can be deceived about functional uses of decoys, making them appear like they are either regularly-used assets—indicating they are likely useful and can be used by the attacker to move laterally to what appears to be a valuable target—or an infrequently-used but valuable asset—indicating they can be used to access privileged and/or critical information.

It is assumed that deception is a capability deployed only by highly mature security organizations. Deception is becoming a mainstream capability across markets. The mid-market CISO is faced with a conundrum—Her security team and budget are small, but she still has a significant threat and risk perception (perhaps she's in an industry without compliance regulations driving investment). She's got some basic security hygiene in place but needs to do something to detect more serious threats, Her wish list from a solution is: i) Fast to get going—a quick win today v/s perfection tomorrow, ii) Easy to use and low maintenance given her small internal security team, iii) Not a point solution, as she can't invest in multiple technologies, and iv) Wide coverage for areas like cloud and IoT. Deception perfectly checks all the boxes above for her, letting her quickly start punching above her weight when it comes to more advanced, targeted threats.

§ 7.1 Advantages of Deception Technology

In anti-submarine warfare, the sighting of a periscope breaking the water is an unambiguous indicator of an imminent threat. We believe deception alerts are very similar, and term them 'periscope events'—a behavior that, when detected, clearly indicates that an attacker is in the network. If you place detection classes on a scale of accuracy, at one extreme you have:

i) Signature-based detection, which is highly accurate but very threat specific, (such as the propeller signature of a specific submarine).

ii) On the other extreme you have behaviors/heuristics which have broad threat coverage, but more prone to false positives (such as a radar contact that may be a submarine or a shoal of fish).

Figure 10:
FIG. 10 is a diagram illustrating signatures vs. behavior vs. deception.
Figure 10:
Figure 10:

Deception's periscope events are the middle ground—highly accurate, but with broad threat coverage (we can broadly detect any type of submarine with extremely low false positives). FIG. 10 is a diagram illustrating signatures vs. behavior vs. deception.

Most security controls are not aware of current business risks (your antivirus does not know or care that you're going through an M&A). However, deception is intrinsically aligned with the current business threat perception. For example, if a company is launching a new product, it can create deception around that product launch, aligning security controls tightly to areas where the organization perceives risk.

Since deception is a detection class, it can be applied broadly horizontally across the enterprise, including environments that are often neglected blind spots. For example, deception can detect threats at the perimeter, the endpoint, the network, Active Directory, and application layers, as well as offer coverage to more neglected environments such as SCADA/ICS, IoT, and cloud. Unlike point solutions, deception also covers the entire kill-chain; from pre-attack reconnaissance to exploitation, privilege escalation, lateral movement, and data-theft/destruction.

False positives cripple security team productivity and drag both IT and security teams through convoluted triage workflows. Often, the process of trying to validate the alert is more time consuming than the actual remediation measure. Deception has an intrinsic low false-positive property—nobody should open a decoy file, log in to a decoy application, use a decoy credential, or scan a decoy server. However, the alerts are also far more contextual; giving insight into the attacker's intent ("they went for the R&D information, not the financial systems").

Most behavior-based systems try to establish a normal baseline and then classify any activity above the baseline as anomalous, this leads to a number of false positives. Deception establishes a zero-activity normal baseline, where any activity at all is worthy of investigation. It also gives detailed IOCs (indicators of compromise). Everything that happens on a decoy is considered evil; so analysts do not need to weed through the data to segregate legitimate user activity and forensically relevant artifacts. Not only can you detect more reliably, but you can 'know your enemy' far better.

You can also use deception to qualify medium or 'warm' alerts from other platforms. For example, a UEBA system may generate a medium risk score for a user's behavior, leaving the analyst in no man's land—"is this a threat, or a false positive?" Dynamic deployment of deception on and around that users environment may result in a higher-order detection if the attack is real.

Ring-fencing potential problem areas in this manner is also exceptionally useful during incident response in environments where the available logging is limited, but a rapid increase in visibility is required. If the DMZ may be compromised, lay down deception and watch for privilege escalation or lateral movement detection while the root cause of the compromise is being investigated. This can help answer two of the most fundamental questions in incident response, "how far in did they get, and are they still in?".

Orchestrated/automated response is most useful only when the trigger event is 100% certain. While plenty of orchestration tooling is being built (like shovels during the gold rush), not many real-world transformational orchestration use cases exist because there are very few alerts that are 100% certain. The ones that are, typically don't require orchestration, because the products that generate them already contain remedial capabilities (for example, an anti-virus detection quarantining a file).

Deception alerts are highly certain, contextual, and real-time, affording opportunities for security teams to orchestrate more complex and invasive scenarios (for example, use of a decoy credential can result in automatic redirection of the compromised asset into a decoy environment, while disabling the logged-on user's account and access in the real environment).

In terms of containment/response use cases, deception alerts can integrate with:

Network Access Control—Quarantine a compromised asset

Web gateways—Disable the compromised asset's Internet access, block phishing sites identified by email decoys.

Endpoint protection—Kill a suspicious process or quarantine the endpoint

EDR—Identify and block IOCs on all other endpoints

Directory Services/Identity and Access Management—Disable the user's account, change a password, and enable/enforce two-factor authentication Firewalls—Dynamically deny access to network segments Zero trust systems as a potential containment mechanism Since deception alerts are contextual, the response can also target the appropriate application. For example, if an attacker targets a decoy SWIFT server in a banking environment, the user's account can be disabled for the real SWIFT server.

§ 7.2 Use Cases of Deception Technology

Deception can be used to detect threats across the kill-chain starting with reconnaissance going all the way up to data theft. Broadly, there can be three key use cases—1) perimeter deception defense, 2) network deception defense, 3) endpoint deception defense,) Identity systems (for e.g., Active Directory) and 5) IoT/OT deception.

§ 7.2.1 Perimeter Deception Defense

At a time when it's possible to scan all IPv4 IPs in under an hour, monitoring all inbound connections—even just the unusual ones—becomes like drinking from the proverbial fire hose. With VMs available in the cloud within minutes, the noise comes not just from suspicious visitors to a page or from adversaries targeting the organization, but from almost anyone that can create a cloud account and run a script or two. Security isn't a big data problem so much as a good data problem.

Setting up deceptive public-facing assets, if done right, can drastically simplify this problem and give you action-able telemetry on who's targeting you. This is different from simply setting up a traditional honeypot with a number of open ports on a public IP. Such a setup is going to generate noisy alerts as everything from Google and Shodan to scripts for college research projects trying to connect to these honeypots. Instead, deploying decoys that mimic beta/staging applications can create high-confidence alerts telling you that an attacker is attempting to reach specific public-facing (but unannounced) infrastructure. Irrespective of their reason and methodology for doing so—including scripts set up to search for such infrastructure belonging to specific organizations, the alerts produced become a high-confidence indicator of intent to locate sensitive infrastructure belonging to your organization.

These alerts become useful pivot points to check for other activity in the valuable but voluminous logs from the WAP (Web Application Firewall) and other sources. For example, other interactions by the source attempting to access public-facing decoys can be looked into and the source optionally blocked. If successful login attempts are discovered, resetting the user's credentials and enabling 2FA (Two Factor Authentication) for the account are common first steps for a containment.

§ 7.2.2 Network Deception Defense

Barring insider threats, once attackers gain a foothold in an organization, they're like a new employee on day one except for the onboarding—they have a very broad sense of the objective they need to achieve, but no information on the relative location of the things they need or how to get there. A strategically deployed set of decoy internal servers and workstations play well here, being available as targets to the attacker. However, simply deploying decoys leaves the odds of them being targeted at not much better than random chance. Effective network deception requires the decoys to be placed in the various locations an attacker might peruse to identify targets; better still if they can be made to look not just like valuable assets on the network, but systems that the appropriate legitimate users interact with to perform theft tasks.

Regular users know the hostnames or network locations of the databases they need to administer, the document servers they need to pull files from, the hosts they must remote into. Even forgetful users that connect to a couple of incorrect hosts in the course of looking for the one they want are unlikely to continue once they can see that they have connected to a different host than the one they intended to connect to.

An attacker, on the other hand, often has something of value to glean from connecting to a different system than the one they seek to target. This results in different behavior from a regular user, making attacker interactions with decoys easy to differentiate from a user that mistyped an IP. As with other types of deception, such alerts then make for great points to begin investigations from.

§ 7.2.3 Endpoint Deception Defense

Consider your usage of the system on your machine. More often than not, you probably know which file you want and where it's located. For folks that deal with a large number of local files, you may search through the system using some keywords you know to be associated with or present in the file you're looking for.

However, if a decoy file is placed on your system, it's unlikely to affect any tasks you need to perform, particularly if you know it's a decoy. To an attacker, though, a the that appears to have legitimate and valuable content, and looks like it is accessed by the user, is a candidate for exfiltration. Coupled with fake processes, and breadcrumbs pointing to decoy workstations/servers posing as legitimate systems accessed by the user, endpoint deception can be put to use to detect not just behavior that would be suspicious on the network, but also behavior that would be the norm on the network but has no legitimate place on a particular endpoint at a particular time.

Even a malicious insider who might be familiar with weaknesses in existing defenses doesn't have extensive knowledge of every valuable file on other endpoints. Additionally, since the goal of many attacks is data theft, theft of decoy files becomes a particularly high priority signal because it indicates an attacker may be close to accomplishing their goal—after all, an attacker stealing decoy files is likely to also be stealing real ones.

§ 7.3 Deception with Other Security Functions

Deception technology is a "force multiplier" for a number of existing capabilities that organizations may already have implemented. Here are some examples:

Deception+Endpoint Detection & Response (EDR)— Endpoint detection can be significantly improved with deception. An attacker using decoy credentials stored in memory, following a decoy SSH or RDP session, or trying to escalate privileges by exploiting a decoy running process provides extremely reliable indicators of malicious host-based activity. The EDR can 'fill in the blanks' into what happened before (which processes ran, what other network connections were created etc.).

Deception+User Entity and Behavior Analytics—User Entity and Behavior Analytics (UEBA) systems are prone to false positives and data paralysis, especially in larger, geo-graphically disparate networks where analysts may not have the context to validate an alert (Eric in the Paris security team doesn't know why Nakamura san is uploading a lot of data in Tokyo). However, the UEBA system can provide excellent enrichment to a deception alert, fleshing out the user backstory. For example, if a decoy file is copied and the user is suddenly logging in outside of office hours concurrently from two places, the detection is very likely to be real.

Deception+Sandboxes—Sandboxing was deception 1.0, focused on convincing malware to detonate and reveal its cards. Modern deception is sandboxing for the human attacker. By providing a wider virtual 'attack surface', and a believable environment for them to progress their attack, higher-order forensics can be developed.

Deception+Threat intelligence—Many threat intelligence services offer dumps of malware hashes, domains or IPs that rapidly go stale or are devoid of context ("block these 5000 IPs because they're from China"). The commercial ramp-up to more specific threat intelligence is significant, and often only consumable by extremely mature security organiza-tions. While deception is typically seen as a behind-the-firewall capability, it is possible to deploy Internet-facing decoys that only engage with targeted threats against a named organization. These 'private threat intelligence' decoys give predictive analytics of attacker activity early on in the reconnaissance phase of the kill chain.

For example, decoy Amazon S3 buckets incorporating the company's name can identify attempted reconnaissance, while decoy UAT, staging and testbed subdomains can identify attackers looking for a weak way in. Decoy login portals/webmail systems/VPNs can also reliably uncover spear-phished credentials (attackers need somewhere to use them). More business-specific use cases include decoy credit cards with a specific bank BIN or fake insurance policy-holder information that may be targeted at renewal time.

The use of deception lets less mature companies create rather than consume threat intelligence that is specifically relevant to theft vertical or geography. More advanced security teams can leverage advanced counterintelligence deception use cases, such as decoy social media accounts to attract spear-phishing.

Deception+Network Traffic Analysis—Network threat detection is a critical piece of the puzzle, especially since attackers cannot avoid using the network to move around. However, network threat analytics tools suffer from scal-ability challenges in deployment and are increasingly blind as more traffic is encrypted, even east-west in the network. Network deception is the 'original honeypot', and it still works exceptionally well at detecting everything from worm-like activity such as network-driven ransomware to targeted attackers in large networks.

Through improvements in virtualization and software-defined networking, we can place network decoys at scale in every subnet and VLAN, as well as in the dark IP space of the network to efficiently detect network-driven threats. Moreover, since the network decoy itself is instrumented, it is not blind to encrypted traffic and can provide full packet forensics about the threat.

Deception+Threat Hunting Platform—Deception and threat hunting are two pillars of 'active defense'—proac-tively attempting to take the fight to the adversary. We find that the champions for deception technology at many of our customers are the threat hunting teams, as they are able to think like the attacker and deploy deception in paths where they perceive they will have to traverse.

A deception alert is a perfect trigger to a hunt mission and can let an analyst ring-fence a potential incident with decoys while they pivot on available data to understand the root cause of the threat. The real-world analogy of a hunter laying traps is extremely applicable here, Deception technology can help you cut down your:

Mean Time To Detect (MTTD): Dwell time usually spans months. When you strategically lay traps across your network, you leave attackers with very limited room to maneuver. This can cut down your MTTD to near-zero.

Mean Time To Know (MTTK): Since deception deploy-ments generate fewer and higher-confidence alerts, the attacker's activity can be studied much more closely, their TTPs fingerprinted, and their intended target iden-tified in minutes instead of days or hours, particularly with a threat hunting team at the console. In fact, we've even seen teams achieve this in single-digit minutes for some attacks.

Mean Time To Respond (MTTR): With the deception deployment in place for a few weeks or months, you can strategize around automated response for known attack types. This frees up man-hours that can then be directed towards defending against more capable adversaries, and other operational requirements.

Deception deployments do away with perhaps your most pressing pain point—the flood of alerts from all your secu-rity tools. Over the years the industry as a whole seems to have come at the needle-in-the-haystack problem saying "Here's some more hay". It's the reason teams miss alerts or tune them out like the OS error dialogues most folks don't bother reading before dismissing. With deception, you can instead begin with a high-confidence alert and trace it back to the proverbial needle using specific attributes in the SIEM, specific network source, time range, and optionally, a username.

Once the response for known attack types is automated, it does away with the tedium of analyzing alerts that any machine could. The boring stuff is automated, leaving you to focus on matters that actually warrant your attention.

§ 7.4 Deception System

FIG. 11 is a network diagram of a deception system 700 with endpoint agents such as the application 350 and with appliances 702 in an enterprise network 704. The deception system includes a central management console 710, an aggregator 712, a decoy farm 714, the appliance 702, the endpoint agent 350, and management system 716.

The central management console 710 is the main com-ponent responsible for everything from UI, managing appli-ances 702 and endpoint agents 350 to event processing and deployment of decoys and policies on the endpoints. The aggregator 712 is configured to terminate tunnels between the appliances 702 and the decoy farm 714. It is responsible for routing of traffic.

The decoy farm 714 can include containers which host the decoys and forward the events and evidence to the central management console 710. The appliance 702 can be a lightweight VM which resides in the client environment and is responsible for projecting the decoys onto their network.

The endpoint agent 350 can be a lightweight agent deployed on the endpoints that is responsible for deploying the endpoint deception and monitoring for the first order detections. It talks to the central management console 710 for the policies and also to send back the events.

§ 7.5 Cloud-Based Deception System

Figure 12:
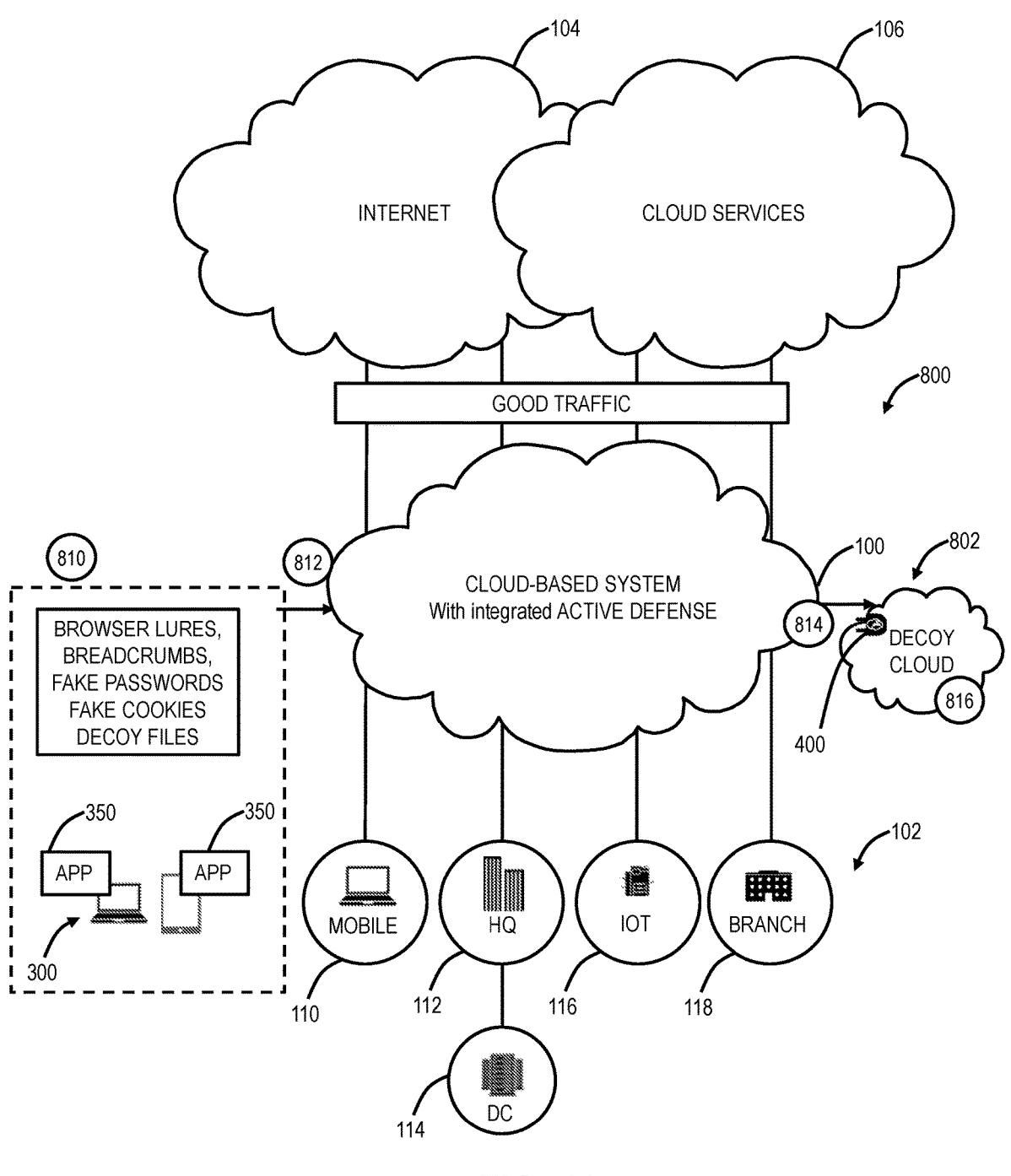
FIG. 12 is a network diagram of a deception system utilizing the cloud-based system in lieu of on-premises appliances.

FIG. 12 is a network diagram of a deception system 800 utilizing the cloud-based system 100 in lieu of on-premises physical or virtual appliances. Deployment of deception is dependent on routing attack network traffic to decoys. Traditional architectures as in the deception system 700 require the use of appliances/virtual machines in order to project decoys onto the network. Disadvantageously, this requires on-premises deployment within the enterprise network 704 which requires IT resources, does not scale with distributed users 102, etc.

The present disclosure includes integrating deception which can be referred to as active defense with the cloud-based system 100. By integrating with the cloud-based system 100 which provides ZTNA, attack traffic that should be destined for decoys can be routed through the cloud-based system 100 'switchboard.' Dynamic routing of traffic based on zero trust principles and modification of the network data path is possible to make on-the-fly decisions on which decoy to send an attacker to. Legitimate traffic can pass through the cloud-based system 100 to 'known good' destinations without any redirection, and intruder traffic can be routed to a decoy cloud 802.

By using the cloud-based system 100 as a zero trust policy director as a switchboard, it is possible to deploy deception into an environment without any physical/virtual appliances or engagement virtual machines. Removal of the appliance creates a completely software-defined deception mesh that can route attack traffic from any device in the network that is connected to the cloud-based system 100 to decoys in the decoy cloud 802.

The decoy compute no longer exists in the user environment and is instead hosted in the decoy cloud 802. Attackers are unaware that their engagement occurs in the decoy cloud 802, and the deception can be dynamically scaled based on the zero trust policy requirements of the user 102. The decoy cloud 802 looks like the enterprise network. Deception policies can be dynamically created based on the user's 102 real application access policy that is captured in the cloud-based system 100. This makes the deception far more believable as it is intrinsically based on the actual user 102 and application 350 trust policy. That is, the application 350 has rich user information based on existing services in the cloud-based system 100. Deception alerts gain additional context/intelligence from the cloud-based system 100 for more actionable alerts. Potentially suspicious traffic that would normally be dropped/allowed can be dynamically redirected to decoys in order to 'play out' the threat, gain better telemetry and validate whether the traffic is legitimate or malicious. Deception becomes a configurable policy action that can be taken by users 102 to define whether traffic is routed to decoys.

Referring to FIG. 12, the application 350 can be configured to support deception technology among other features, and the decoy cloud 802 can be a SaaS hosted environment for each customer (i.e., tenant, enterprise, etc.) which is isolated and segregated from the customer's real IT environment. The decoy cloud 802 includes a reverse-connect connection broker (e.g., the app connector 400) deployed in the decoy cloud environment that connects to the cloud-based system 100.

The cloud-based system 100 can include a policy director which includes policies for routing traffic to the decoy cloud 802 environment. The policies are automatically and dynamically created by the policy director within the cloud-based system. Additionally, users can create their own policies to granularly decide when to send traffic to decoys for example, based on traffic profile, time of day, user activity, etc. Traffic is evaluated by the cloud-based system 100 and dynamic decisions are made on whether to route it to legitimate applications or to decoys. The deception system 800 inter-links with the cloud-based system 100, correlating user/device/application identity mappings for high-context, low false positive alerting.

In an example operation, the endpoint agent 300 can plant browser lures, breadcrumbs, fake passwords, fake cookies, decoy files, etc. (collectively referred to as "fake assets") on the user device 300 (step 810), and corresponding decoys associated with the fake assets are deployed in the decoy cloud 802. For example, fake passwords can be for legitimate sites that can be decoyed in the decoy cloud 802. When an intruder accesses the fake assets (step 812), the cloud-based system 100 blocks the intruder traffic since it is not good traffic and diverts it to the decoys (step 814). The decoy cloud 802 monitors the activity of the intruder to gain valuable telemetry, private threat intelligence, indicators of compromise, threat hunting, etc. (step 816). Advantageously, this approach has low false positives (i.e., no legitimate use for the fake assets, so assume any access is illegitimate) and rapid containment of the intrusion.

Specifically, when an intruder accesses a fake access on an ingress connection, the egress connection is routed back to the decoy cloud 802 via the cloud-based system 100 instead of back out as good traffic. In this manner, the intruder is unaware and performs activity in the decoy cloud 802. Here, it is possible to gain intelligence about the threat without actually compromising actual resources.

Advantageously, this approach can be used to secure the endpoint device 300, secure applications thereon, secure the cloud, and the user's 102 identity.

§ 7.6 Cloud-Based Deception Process

Figure 13:
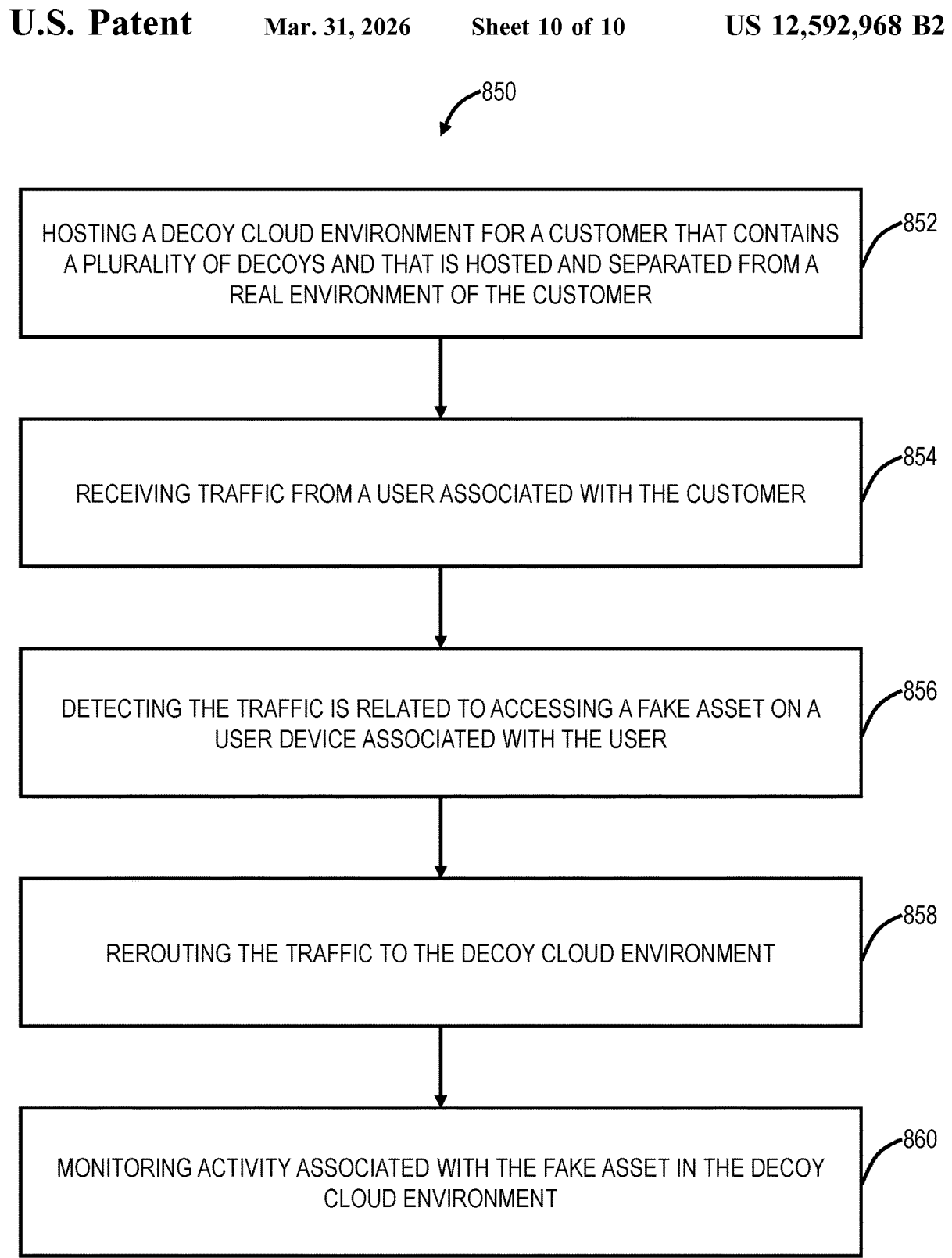
FIG. 13 is a flowchart of a cloud-based deception process.

FIG. 13 is a flowchart of a cloud-based deception process 850. The cloud-based deception process 850 contemplates operation via the cloud-based system 100 and the decoy cloud 802. In an embodiment, the decoy cloud 802 can be part of the cloud-based system 100, it is show separately to illustrate the functionality. The cloud-based deception process 850 can be a computer-implemented method having steps, implemented via one or more servers having processors configured to implement the steps, and as instructions embodied in a non-transitory computer-readable medium for causing one or processors to implement the steps.

The cloud-based deception process 850 includes hosting a decoy cloud environment for a customer that contains a plurality of decoys and that is hosted and separated from a real environment of the customer (step 852); receiving traffic from a user associated with the customer (step 854); detecting the traffic is related to accessing a fake asset on a user device associated with the user (step 856); rerouting the traffic to the decoy cloud environment (step 858); and monitoring activity associated with the fake asset in the decoy cloud environment (step 860).

The steps can further include detecting the traffic is unrelated to any fake asset on the user device (300) and processing the unrelated traffic. That is, the cloud-based system 100 can perform any functions on the unrelated traffic, in addition to supporting the deception system 800. The processing can include any of allowing the unrelated traffic, blocking the unrelated traffic, cleaning the unrelated traffic, threat detecting the unrelated traffic, sandboxing the unrelated traffic, and the like.

The fake assets can include any of deceptive assets, files, breadcrumbs, lures, bait, network traffic, passwords, keys, session information, and cookies. The key aspect of the fake assets is they are illegitimate and should never be accessed except for malicious purposes. The fake assets are meant to look real and entice any intruder. The fake assets can be based on a role of the user, such as determined based on historical monitoring of the user. Specifically, the cloud-based system 100 has rich user information for specifically tailoring the fake assets.

The steps can further include determining an indication of compromise for the user and/or the user device and providing a notification based thereon. Also, there can be various remediation approaches.

The rerouting can be based on a set of policies that include traffic profile, time of day, and user activity. The decoy cloud 802 can include the connector 400 configured to dial out only and reject inbound connections.

8.0 BREACH DETECTION

The deception system 800 through the cloud-based system 100 is a high-fidelity, low false positive system to efficiently detect targeted, sophisticated threats both internally and on the perimeter using heuristic filtering and dynamic risk scoring of threats that engage with decoy IT assets including deceptive infrastructure, credentials, files, users, identity management systems and network traffic. The deception system 800 is difficult to evade as it is hidden from the attacker.

Advantageously, the deception system 800 provides breach detection technology to 1) Identify perimeter application threats while filtering out Internet 'noise' in order to identify only targeted threats against the perimeter.
2) Identify threats on endpoint devices without the overhead of collecting, transmitting and storing all endpoint activity.
3) Prioritize threats based on a dynamic risk scoring algorithm that tracks attacker activity in real-time and modifies the threat score based on attack patterns. The risk score is used for zero-trust conditional access policies.
4) Provide a hard to evade breach detection technology leveraging deception and countermeasures.

Most traditional security systems categorize alerts into 'high/medium/low' buckets (or some other discrete categorization) as they are prone to false positives. With deception-based breach detection technology, false positives are minimal, so we granularly score every attacker action in order to build a risk-based alerting and prioritization model.

The risk scoring algorithm operates by monitoring all activity by unique attackers against deceptive/decoy assets that include fake systems, passwords, files, and network traffic. Every additional step taken by the attacker increases the score. For example, starting a network connection, upgrading it to a full connection, sending data, sending data that has a malicious payload.

The risk score can be used with thresholds to make automatic policy decisions in a zero-trust system. For example, if the score crosses 100, an automated containment response is initiated. Of note, all hits on the fake assets are malicious by definition—this risk scoring covers a unique way to convey the actual threat.

Using this novel scoring approach, this breach detection system can detect threats against the perimeter using decoy systems on the Internet. Traditional systems would generate too much 'noise' for such an approach to be viable, however, by dynamically tracking attacker behavior, the system can generate extremely low false positives and differentiate between targeted attacks v/s non targeted general attacks on the Internet.

On the internal network, this system 800 utilizes deceptive assets, files, breadcrumbs, lures, bait, network traffic, passwords, keys and cookies in order to detect attacks without logging all system activity and transmitting it to an analysis system like traditional approaches do. This system can perform all threat detection locally on the endpoint device without the overhead of transmitting, analyzing, and storing data centrally. This distributed detection quality allows it to offer substantially greater scalability to millions of endpoint devices through reduced resource utilization.

Similar to 'trap pins' designed to make physical locks hard to pick, the system has countermeasures to make it extremely hard to evade. By hiding on the system, creating deceptive versions of itself and other security software and detecting active attempts to probe or discover the threat detection system, an attacker's attempts to subvert the threat detection not only are thwarted, but raise a high-risk score alert of an evasion attempt.

An advantage of the deception system 800 with the cloud-based system 100 is there is no need to log all activity on the user device 300, this is already managed off-device in the cloud-based system 100. The user device 300, with respect to deception, only has to log activity related to the fake assets. This minimizes the resource consumption at the user device 300.

9.0 AUTO-DECOY AND BREADCRUMB CREATION

The present disclosure can include analyzing a user's activity in order to dynamically create deceptive assets such as files, passwords, breadcrumbs, lures, cookies, sessions etc. that are contextually relevant to the user's job profile, daily tasks, and designation. The system can auto-configure itself to differentiate between, for example, a vice president of Marketing v/s an IT system administrator. Specifically, the cloud-based system 100 and the application 350 have rich historical user information that can be used to further leverage the fake assets. The system 800 also creates network traps that are logically relevant pointers to the breadcrumbs. For example, a finance user will have breadcrumbs that automatically point to a finance related file server without user configuration. The system 800 can also automatically generate 'blend in' and 'stand out' decoys that mimic attributes such as the organization's network naming conventions and types of hardware used.

Advantageously, the present disclosure can

1) Automate the process of creating deceptive campaigns without requiring any manual user input in order to decide the deception strategy and provision the deceptive assets.
2) Substantially improve the realism of the deception to ensure greater probability of engagement by attackers who may know the 'lay of the land' either as insiders, or through earlier reconnaissance of the target.

3) Ensure that every deception campaign is unique for every organization, making the deception extremely difficult to fingerprint.

4) Allow users to immediately and dynamically modify the deception automatically or with the push of a button ("one-click"), where all deceptive assets can change their personalities unaided.

An aspect of the breadcrumb creation is the cloud-based system 100 has knowledge of user type. Also, it is possible to multiply fake assets to make each look unique and look like a customer environment so the attackers are unaware.

10.0 CONCLUSION

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a Read-Only Memory (ROM), a Programmable Read-Only Memory (PROM), an Erasable Programmable Read-Only Memory (EPROM), an Electrically Erasable Programmable Read-Only Memory (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

The foregoing sections include headers for various embodiments and those skilled in the art will appreciate these various embodiments may be used in combination with one another as well as individually. Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A non-transitory computer-readable storage medium having computer-readable code stored thereon for programming one or more processors to perform steps of:

monitoring activity associated with a plurality of decoys hosted in a decoy cloud environment for a customer, wherein the decoy cloud environment is separate from a real environment of the customer, and wherein the activity is between one or more fake assets on user devices of users associated with the customer and corresponding decoys in the decoy cloud environment;

generating a dynamic risk score configured to modulate in direct accord with the activity based on monitoring various steps taken between a fake asset and a decoy, wherein the monitoring is configured to track progressive stages of interaction between the fake assets and the corresponding decoys, and wherein each step taken by a user with the one or more fake assets, including initiating or upgrading a network connection, sending data, executing a decoy file, or using a decoy credential, increases the dynamic risk score in real time; and detecting a breach of the customer based on the dynamic risk score exceeding a threshold, wherein any interaction with a fake asset is inherently treated as malicious such that the risk score begins from a zero-activity baseline and increases exclusively upon fake asset interactions.

2. The non-transitory computer-readable storage medium of claim 1, wherein scoring includes progressively increasing the dynamic risk score by discrete steps based on each additional step taken by an attacker between the fake asset and the decoy, including at least opening a decoy file, using a decoy credential, or attempting to access a decoy application.

3. The non-transitory computer-readable storage medium of claim 2, wherein the dynamic risk score is updated in real-time with each step, the step defining any of starting a network connection, upgrading the network connection, sending data, and sending data that has a malicious payload, and wherein the dynamic risk score is compared against a threshold to trigger an automated containment response.

4. The non-transitory computer-readable storage medium of claim 1, wherein the steps include:

performing an automated containment response on the user responsive to the breach, including at least quarantining the compromised endpoint or disabling user account access in the real environment.

5. The non-transitory computer-readable storage medium of claim 4, wherein the monitoring, scoring, detecting, and performing are all performed in real-time.

6. The non-transitory computer-readable storage medium of claim 4, wherein the monitoring, scoring, detecting, and performing are all performed locally at the user device, and wherein the user device only logs activity related to the one or more fake assets.

7. The non-transitory computer-readable storage medium of claim 4, wherein the monitoring, scoring, detecting, and performing are all performed in a cloud-based system located between the user device and the Internet.

8. The non-transitory computer-readable storage medium of claim 1, wherein the fake assets include any of deceptive assets, files, breadcrumbs, lures, bait, network traffic, passwords, keys, session information, and cookies.

9. The non-transitory computer-readable storage medium of claim 1, wherein the fake assets are automatically generated based on a role of the user as determined from historical monitoring, such that a finance user receives financial record breadcrumbs and an R&D user receives R&D-related breadcrumbs.

10. The non-transitory computer-readable storage medium of claim 1, wherein the steps include:

updating the scoring over time based on feedback.

11. A method comprising steps of:

monitoring activity associated with a plurality of decoys hosted in a decoy cloud environment for a customer, wherein the decoy cloud environment is separate from a real environment of the customer, and wherein the activity is between one or more fake assets on user devices of users associated with the customer and corresponding decoys in the decoy cloud environment;

generating a dynamic risk score configured to modulate in direct accord with the activity based on monitoring various steps taken between a fake asset and a decoy, wherein the monitoring is configured to track progressive stages of interaction between the fake assets and the corresponding decoys, and wherein each step taken by a user with the one or more fake assets, including initiating or upgrading a network connection, sending data, executing a decoy file, or using a decoy credential, increases the dynamic risk score in real time; and detecting a breach of the customer based on the dynamic risk score exceeding a threshold, wherein any interaction with a fake asset is inherently treated as malicious such that the risk score begins from a zero-activity baseline and increases exclusively upon fake asset interactions.

12. The method of claim 11, wherein scoring includes increasing the dynamic risk score based on any activity by an attacker between the fake asset and the decoy, including at least opening a decoy file, using a decoy credential, or attempting to access a decoy application.

13. The method of claim 12, wherein the dynamic risk score is updated with each step of starting a network connection, upgrading the network connection, sending data, and sending data that has a malicious payload, and wherein the dynamic risk score is compared against a threshold to trigger an automated containment response.

14. The method of claim 11, wherein the steps include:

performing an automated containment response on the user responsive to the breach, including at least quarantining the compromised endpoint or disabling user account access in the real environment.

15. The method of claim 14, wherein the monitoring, scoring, detecting, and performing are all performed in real-time.

16. The method of claim 14, wherein the monitoring, scoring, detecting, and performing are all performed locally at the user device, and wherein the user device only logs activity related to the one or more fake assets.

17. The method of claim 14, wherein the monitoring, scoring, detecting, and performing are all performed in a cloud-based system located between the user device and the Internet.

18. The method of claim 11, wherein the fake assets include any of deceptive assets, files, breadcrumbs, lures, bait, network traffic, passwords, keys, session information, and cookies.

19. The method of claim 11, wherein the fake assets are automatically generated based on a role of the user as determined from historical monitoring, such that a finance user receives financial record breadcrumbs and an R&D user receives R&D-related breadcrumbs.

20. The method of claim 11, wherein the steps include:

updating the scoring over time based on feedback.

* * * * *